United States Patent
Dong et al.

(10) Patent No.: US 8,213,758 B2
(45) Date of Patent: Jul. 3, 2012

(54) RARE EARTH DOPED AND LARGE EFFECTIVE AREA OPTICAL FIBERS FOR FIBER LASERS AND AMPLIFIERS

(75) Inventors: Liang Dong, Ann Arbor, MI (US); Xiang Peng, Orlando, FL (US)

(73) Assignee: IMRA America, Inc., Ann Arbor, MI (US)

( * ) Notice: Subject to any disclaimer, the term of this patent is extended or adjusted under 35 U.S.C. 154(b) by 221 days.

(21) Appl. No.: 12/789,931

(22) Filed: May 28, 2010

(65) Prior Publication Data

US 2010/0329618 A1    Dec. 30, 2010

Related U.S. Application Data

(62) Division of application No. 12/246,377, filed on Oct. 6, 2008, which is a division of application No. 11/693,633, filed on Mar. 29, 2007, now Pat. No. 7,450,813.

(60) Provisional application No. 60/846,012, filed on Sep. 20, 2006.

(51) Int. Cl.
  *G02B 6/032* (2006.01)
(52) U.S. Cl. .......... 385/127; 385/123; 385/126
(58) Field of Classification Search ............ 385/123, 385/126–128, 141, 142, 144
  See application file for complete search history.

(56) References Cited

U.S. PATENT DOCUMENTS

| | | |
|---|---|---|
| 4,339,174 A | 7/1982 | Levin |
| 4,412,853 A | 11/1983 | Partus |
| 4,425,146 A | 1/1984 | Izawa |
| 4,500,168 A | 2/1985 | Kajioka et al. |
| 4,784,977 A | 11/1988 | Aitken |
| 4,815,079 A | 3/1989 | Snitzer et al. |
| 5,032,001 A | 7/1991 | Shang |
| 5,158,587 A | 10/1992 | Kyoto et al. |
| 5,175,785 A | 12/1992 | Dabby |
| 5,353,363 A | 10/1994 | Keck |
| 5,452,394 A | 9/1995 | Huang |
| 5,802,236 A | 9/1998 | DiGiovanni et al. |
| 5,818,630 A | 10/1998 | Fermann et al. |
| 5,907,652 A | 5/1999 | DiGiovanni et al. |

(Continued)

FOREIGN PATENT DOCUMENTS

CN    1686884    10/2005

(Continued)

OTHER PUBLICATIONS

Limpert, et al. "High-power air-clad large-mode-area photonic crystal fiber laser", Optics Express, #2249, Apr. 7, 2003, vol. 11, No. 7, Received Mar. 20, 2003; Revised Mar. 31, 2003, pp. 818-823.

(Continued)

*Primary Examiner* — Ellen Kim

(74) *Attorney, Agent, or Firm* — Knobbe, Martens, Olson & Bear, LLP

(57) ABSTRACT

Various embodiments described herein include rare earth doped glass compositions that may be used in optical fiber and rods having large core sizes. Such optical fibers and rods may be employed in fiber lasers and amplifiers. The index of refraction of the glass may be substantially uniform and may be close to that of silica in some embodiments. Possible advantages to such features include reduction of formation of additional waveguides within the core, which becomes increasingly a problem with larger core sizes.

35 Claims, 15 Drawing Sheets

U.S. PATENT DOCUMENTS

| | | |
|---|---|---|
| 6,243,522 B1 | 6/2001 | Allan et al. |
| 6,334,019 B1 | 12/2001 | Birks et al. |
| 6,411,762 B1 | 6/2002 | Anthon et al. |
| 6,614,975 B2 | 9/2003 | Richardson et al. |
| 6,711,918 B1 | 3/2004 | Kliner et al. |
| 6,941,053 B2 | 9/2005 | Lauzon et al. |
| 6,959,022 B2 | 10/2005 | Sandrock et al. |
| 6,987,783 B2 | 1/2006 | Fajardo |
| 7,050,686 B2 | 5/2006 | Farroni et al. |
| 7,062,137 B2 | 6/2006 | Farroni et al. |
| 7,068,900 B2 | 6/2006 | Croteau et al. |
| 7,116,887 B2 | 10/2006 | Farroni et al. |
| 7,280,730 B2 | 10/2007 | Dong et al. |
| 7,283,714 B1 | 10/2007 | Gapontsev et al. |
| 7,305,160 B2 | 12/2007 | Park et al. |
| 7,450,813 B2 | 11/2008 | Dong |
| 7,760,771 B2 * | 7/2010 | Salokatve et al. ............ 372/6 |
| 8,041,172 B2 * | 10/2011 | Sillard et al. ............ 385/124 |
| 2002/0037145 A1 * | 3/2002 | Irie et al. ............ 385/127 |
| 2002/0164137 A1 | 11/2002 | Johnson et al. |
| 2002/0176676 A1 | 11/2002 | Johnson et al. |
| 2004/0005127 A1 | 1/2004 | Kliner |
| 2004/0086245 A1 | 5/2004 | Farroni et al. |
| 2004/0096172 A1 | 5/2004 | Bongrand et al. |
| 2004/0145996 A1 | 7/2004 | Shinoda |
| 2004/0170358 A1 * | 9/2004 | Ishii et al. ............ 385/43 |
| 2004/0240816 A1 | 12/2004 | Oh et al. |
| 2005/0069269 A1 | 3/2005 | Libori |
| 2005/0157998 A1 | 7/2005 | Dong et al. |
| 2005/0175059 A1 | 8/2005 | Leclair et al. |
| 2005/0191017 A1 | 9/2005 | Croteau et al. |
| 2006/0179888 A1 | 8/2006 | DiGiovanni et al. |
| 2006/0198589 A1 * | 9/2006 | Sako et al. ............ 385/123 |
| 2006/0263024 A1 | 11/2006 | Dong et al. |
| 2007/0142199 A1 | 6/2007 | Schneider et al. |
| 2009/0123121 A1 | 5/2009 | Dong et al. |
| 2010/0098112 A1 | 4/2010 | Gapontsev et al. |
| 2010/0124396 A1 | 5/2010 | Coon et al. |

FOREIGN PATENT DOCUMENTS

| | | |
|---|---|---|
| EP | 1043281 | 10/2000 |
| FR | 2333628 | 7/1977 |
| GB | 2103202 | 2/1983 |
| JP | 59 52201 | 3/1984 |
| JP | 63 303823 | 12/1988 |
| JP | 5345632 | 12/1993 |
| JP | 6037385 | 2/1994 |
| JP | 6298542 | 10/1994 |
| JP | 2002116181 | 4/2002 |
| WO | WO 9836300 | 8/1998 |
| WO | WO 99/30391 | 6/1999 |
| WO | WO 2005054139 | 6/2005 |
| WO | WO 2006112071 | 10/2006 |

OTHER PUBLICATIONS

Limpert, et al. "Extended single-mode photonic crystal fiber lasers", Optics Express, #10015, Apr. 3, 2006, vol. 14, No. 7, Received Dec. 19, 2005; Revised Feb. 12, 2006, pp. 2715-2720.

Russell, "Photonic Crystal Fiber: Finding the Holey Grail", Optics Photonics News, Jul./Aug. 2007, pp. 27-31.

Laperle et al., "Yb-doped LMA triple-clad fiber laser" SPIE Proceedings Paper, vol. 6343: Photonics North 2006, Pierre Mathieu, Editors, pp. 63430X-1 to 63430X-9, Sep. 8, 2006.

Croteau et al., "Bending insensitive highly Yb-doped LMA triple-clad fiber for nearly diffraction-limited laser output" SPIE Proceedings Laser Beam Control and Applications, vol. 6101, pp. 61010G-1 to 61010G-10, Feb. 16, 2006.

* cited by examiner

RARE EARTH DOPED AND LARGE EFFECTIVE AREA OPTICAL FIBERS FOR FIBER LASERS AND AMPLIFIERS

CROSS-REFERENCE TO RELATED APPLICATIONS

This application is a divisional of U.S. patent application Ser. No. 12/246,377, titled "Rare Earth Doped and Large Effective Area Optical Fibers for Fiber Lasers and Amplifiers," filed Oct. 6, 2008, which is a divisional of U.S. patent application Ser. No. 11/693,633 titled "Rare Earth Doped and Large Effective Area Optical Fibers for Fiber Lasers and Amplifiers" filed Mar. 29, 2007, now U.S. Pat. No. 7,450,813, which claims priority to U.S. Provisional Patent Application No. 60/846,012 entitled "Rare-Earth-Doped Large Effective Area Optical Fibers for Fiber Lasers and Amplifiers" filed Sep. 20, 2006, each of which is hereby incorporated by reference herein in its entirety.

BACKGROUND

1. Field of the Invention

This application relates to optical fibers including, for example, rare earth doped optical fibers and fibers with large effective area, which can be used for example in fiber lasers and amplifiers, as well as methods of making such fibers.

2. Description of Related Art

Fiber lasers have shown great promise over the last decade over their solid state counterpart due to a variety of advantages. Fiber lasers are easy to manufacture, are more efficient in heat dissipation, more stable, produce better beam quality, and are more reliable and compact.

Major limits in scaling up power in fiber lasers include nonlinear effects and optical damage, which are a direct consequence of tight confinement of the optical mode in the laser. There are a number of nonlinear effects in optical fibers. Self-phase modulation dominates in high peak power ultra short pulse generations. Raman scattering is one of the major limitations for longer pulses and CW operation. Brillouin scattering dominates in narrow spectral line width application.

There have been many studies on how to counteract these nonlinear effects. Some level of self-phase modulation can be balanced by dispersion in self-similaritons. Raman scattering can be reduced by W-type waveguide design to increase loss at Stoke wavelengths. Brillouin scattering can also be reduced by reducing acoustic waveguiding. Since all of these nonlinear effects are a direct consequence of high optical intensity in the optical fiber core, an increase of core size, which is equivalent to increase of effective mode area, can effectively reduce optical intensity and consequently nonlinear effects.

Multimode fibers with larger core size can be used to operate as near diffraction limited amplifiers in the presence of appropriate spatial filters and/or selective modal excitation of the fundamental mode. The use of multimode fibers enables the increase of core size beyond that offered by single mode fibers. See, e.g., Fermann et al in U.S. Pat. No. 5,818,630, which is incorporated by reference herein in its entirety. As fiber becomes more multi-mode with an increase of core size, easy launch and robust propagation of fundamental mode are also increasingly important in these fibers in order to maintain good beam quality.

Another effective method of reducing nonlinear effect is to use short length of fiber. This approach involves highly rare earth doped host glass.

What is needed therefore are glasses that provide for large core and/or high doping.

SUMMARY OF CERTAIN EMBODIMENTS

Various embodiments described herein include rare earth doped glass compositions which may be used in optical fiber and rods having large core sizes. The index of refraction of the glass may be substantially uniform and may be close to that of silica in some embodiments. Possible advantages to such features include reduction of formation of additional waveguides within the core, which becomes increasingly a problem with larger core sizes.

For example, various embodiments described herein comprise a doped glass comprising silica having a refractive index, at least about 10 mol % phosphorus in said silica, at least about 10 mol % boron in said silica, and rare earth ions in said silica. The rare earth ions have a concentration in the silica of at least about 1000 mol ppm. The silica having the phosphorus, the boron, and the rare earth ions therein has a refractive index within about ±0.003 or less of the refractive index of the silica.

Other embodiments described herein comprise a method of fabricating rare earth ion doped glass. The method comprising stacking multiple rods comprising rare earth ion doped glass and drawing the stacked rods to form a first rod. In some embodiments, the first rod may be cut into shorter sections that may be stacked and drawn to form a second rod. This second rod may have an effective refractive index uniformity with less than about $5 \times 10^{-4}$ maximum peak-to-peak variation measured with refractive index profiler with a spatial resolution of 0.1 μm.

Other embodiments described herein comprise a rod comprising a core doped with rare earth ions and a cladding. The core has an effective refractive index uniformity with less than about $5 \times 10^{-4}$ maximum peak-to-peak variation measured with refractive index profiler with a spatial resolution of between 0.1 to 0.5 μm.

Other embodiments described herein comprise a fiber comprising a core doped with rare earth ions and a cladding. The core has an effective refractive index uniformity with less than about $5 \times 10^{-4}$ maximum peak-to-peak variation measured with a refractive index profiler with a spatial resolution of between 0.1 to 0.5 μm.

Other embodiments described herein comprise a rod comprising a core doped with rare earth ions and a cladding, wherein the core comprises a doped region at least 200 microns square ($\mu m^2$) with an average refractive index within about ±0.003 or less of the refractive index of the silica.

Other embodiments described herein comprise a fiber comprising a core doped with rare earth ions and a cladding, wherein the core comprises a doped region at least 200 microns square ($\mu m^2$) with an average refractive index within about ±0.003 or less of the refractive index of the silica.

Other embodiments described herein comprise a step index optical fiber comprising a core having a core radius ρ, a first cladding disposed about the core, and a second cladding disposed about the first cladding. The first cladding has an outer radius $\rho_1$. The core and the first cladding have a difference in index of refraction Δn, and the first cladding and the second cladding have a difference in index of refraction $\Delta n_1$. For this step index optical fiber, (i) less than 10 modes are supported in the core, (ii) the first cladding radius, $\rho_1$, is greater than about 1.1ρ and less than about 2ρ, and (iii) the refractive index difference between first cladding and said second cladding, $\Delta n_1$, is greater than about 1.5Δn and less than about 50Δn.

Other embodiments described herein comprise an optical fiber system for providing optical amplification. The optical fiber system comprises an optical fiber doped with one or more types of rare earth ions. The optical fiber has a tapered input and a length extending therefrom. The optical fiber system further comprises an optical pump optically coupled to the optical fiber and an optical source optically coupled to the tapered input of the optical fiber. The tapered input end supports a reduced number of optical modes than the length extending from the tapered input.

Other embodiments described herein comprise a method of fabricating glass. The method comprises introducing boron by vapor deposition and introducing phosphorous by vapor deposition, wherein the boron and phosphorous are introduced at different times. Introducing the boron and phosphorous at different times prevents that reaction of boron and phosphorous in vapor phase.

BRIEF DESCRIPTION OF THE DRAWINGS

Exemplary embodiments of the apparatus, compositions, and methods disclosed herein are illustrated in the accompanying drawings, which are for illustrative purposes only. The drawings comprise the following figures, in which like numerals indicate like parts.

DETAILED DESCRIPTION OF CERTAIN PREFERRED EMBODIMENTS

Figure 1:
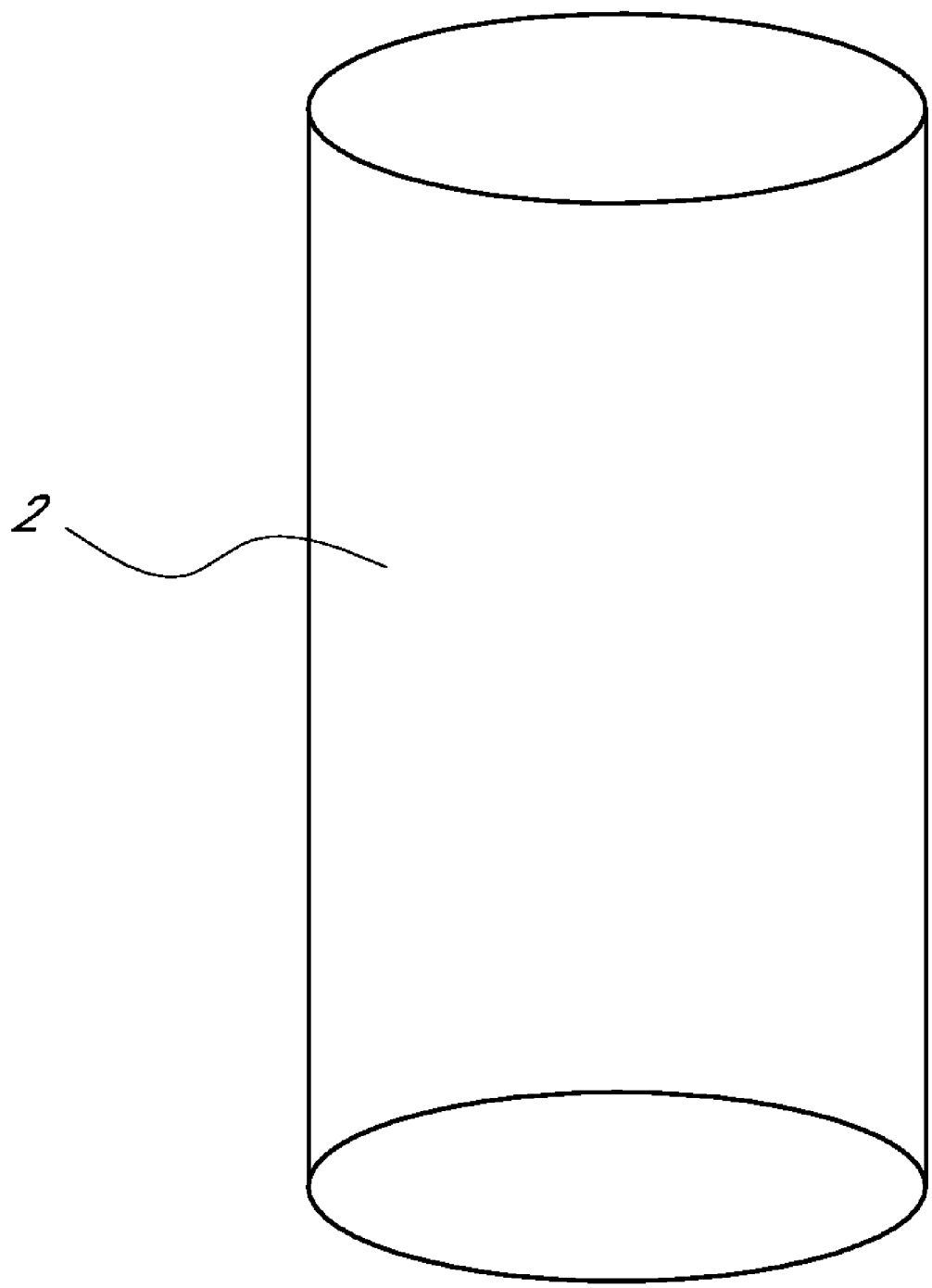
FIG. 1 schematically illustrates a highly doped glass in the form of a rod that can be used in fabrication of optical fibers in some embodiments described herein.

The details of the inventions will be explained through examples and illustrations. It is easy to see by a person skilled in the art that many possible variations are also possible, not limited to the process details used in the examples.

As described above, one limitation to scaling up power in fiber lasers includes nonlinear effects and optical damage, which are a direct consequence of tight confinement of the optical mode in the laser. Since these nonlinear effects are a direct consequence of high optical intensity in the optical fiber core, an increase of core size, which is equivalent to increase of effective mode area, can effectively reduce optical intensity and consequently the nonlinear effects.

The use of multimode fibers can enable the increase of core size beyond that offered by single mode fibers. Multimode fibers with larger core size can be used to operate as near diffraction limited amplifiers in the presence of appropriate spatial filters and/or selective modal excitation of the fundamental mode. See, e.g., Fermann et al in U.S. Pat. No. 5,818,630, which is incorporated by reference herein in its entirety.

Conventional fiber reaches a core diameter limit of ~35 μm if robust fundamental mode operation is required, mainly due to launch difficulty and inter-modal coupling in a highly multi-mode fiber. In the past few years, a new design based on photonic crystal fibers (PCF) has been studied. This design enables demonstration of large core fiber which supports a single mode or very few modes at the expense of a weak waveguide design.

Limpert et al discloses photonic crystal fibers with core diameter of ~28 μm in "High-power air-clad large-mode-area photonic crystal fiber laser" in Optics Express, vol. 11, pp. 818-823, 2003, which is incorporated by reference herein in its entirety. This fiber design has a large number of small holes with hole-diameter-to-hole-spacing ratio d/Λ of less than 0.18 to ensure single mode propagation. The hole diameter d used is comparable to the wavelength of operation λ with d/λ≈2. At this small hole size over wavelength ratio, significant optical power penetration into the air holes takes place and this leads to severe bending sensitivity. This design is again limited to ~35 μm for robust fundamental mode operation, mainly due to high bend loss.

Limpert et al discloses a rod with a photonic crystal fiber design in "Extended single-mode photonic crystal fiber lasers," Optics Express, vol. 14, pp. 2715-2720, 2006, which is incorporated by reference herein in its entirety. Core diameters up to 100 μm with photonic crystal designs have been achieved in rods with diameter of 1.5 mm. The d/Λ ratio in 100 μm core rod is 0.2. The rod structure keeps the waveguide straight and mitigates the high bending loss. Length of the rod is limited to 0.5 meters for practical reasons.

In contrast, the design approach disclosed in U.S. patent application Ser. No. 10/844,943, entitled "Large Core Holey Fibers," which is incorporated by reference herein in its entirety, uses a much smaller number of much larger holes. The design creates much larger leakage channels for higher order modes to escape, leading to high propagation loss for the higher order modes. The use of much larger air holes reduces bending sensitivity. In a recent implementation of the design, d/Λ as high as 0.65 are used leading to a much reduced bending loss. The much larger hole-diameter-to-wavelength ratio d/Λ effectively prevents optical power penetration into the hole, leading to much improved optical guidance over a curved fiber. This type of design also reduces inter-modal coupling due to high leakage loss of the higher order modes, leading to much improved single mode propagation.

To make practical amplifier fibers with the photonic crystal fiber design and leakage channel design disclosed in U.S. patent application Ser. No. 10/844,943, refractive index uniformity over the doped core is preferably better than what conventional optical fiber fabrication can provide.

When the core becomes larger, index non-uniformity over the core can lead to formation of local waveguides due to local higher refractive index surrounded by lower refractive index material. The formation of local waveguides depends on the level of the refractive index non-uniformity as well as the geometric size of the index non-uniformity. Substantial refractive uniformity over the core can reduce this local waveguiding. In particular, by keeping the non-uniformity at a small geometric size, local variations in refractive index will not form waveguides. In various embodiments, therefore the index non-uniformity is kept below few times the scale of a wavelength. Additionally, large index non-uniformity is made smaller. Such uniformity is easier to achieve for small cores than for large cores.

Additionally, waveguiding may be formed in the core if the refractive index in the doped region of the core is higher than the undoped regions of the core. The core may for example, comprise silica. If the portions of the silica that are doped to provide optical gain have a higher index of refraction than undoped silica, additional local waveguiding may result. Precise index-matching of the doped and undoped regions of the core may reduce this problem. When the doped area is larger, for example with a larger effect core area, closer index matching may be more useful than if the doped region is small. Accordingly, in various embodiment described herein, the average refractive index of the doped core also is controlled to be close to that of the cladding glass, which is also used in the core. Such control of the refractive index of the doped glass can be difficult using known host materials for rare earth ions with doping levels of 3000 mol ppm and beyond.

In certain embodiments described herein, the desired refractive index uniformity and average refractive index can be provided by stacking fluorine-doped silica rods with lower refractive index than silica in addition to the highly ytterbium-doped rods with higher refractive index in the core and drawing the stacked rods down to produce a core rod. See, e.g., "Extended single-mode photonic crystal fiber lasers," Optics Express, vol. 14, pp. 2715-2720, 2006, which is incorporated by reference herein in its entirety. The number of fluorine-doped rods and the number of ytterbium-doped rods are carefully chosen to give an overall average refractive index close to that of silica. The total number of the two types of rods is large and they are evenly distributed in a stack. The rods are typically stacked into a hexagonal stack and drawn down to produce a core rod. High degree of average refractive index control can be achieved this way. Since light cannot see structure with dimension much less than the wavelength of the light, highly uniform refractive index can be achieved when the initial individual rods are reduced to a dimension around the wavelength of the light in the final core. This technique, however, reduces the level of average ytterbium doping in the final core due to the dilution from the non-ytterbium-containing fluorine-doped silica rods. Such fluorine doped rods may be used to achieve average refractive index, but may not contain ytterbium. This approach will lower the average ytterbium level which is used for providing gain.

Nevertheless, in theory precise control of average refractive index can be achieved by controlling the ratio of the numbers of rods of each type in a glass comprising two types of rods, one with high refractive index and one with low refractive index. See, e.g., U.S. Pat. No. 6,711,918 B1 issued to Kliner et al, which is incorporated by reference herein in its entirety. A preform can be made where cladding glass comprises a smaller number of the high refractive index rods while core comprises a larger number of high refractive index rods.

Conventional host for ytterbium in fiber lasers and amplifiers has been silica glass host. Some level of aluminum or phosphorus is often added to reduce ytterbium-clustering at high doping levels. Ytterbium-clustering is not desirable due to the fact that interaction between ytterbium ions could lead to multi-photon up-conversion and consequently additional energy loss in a laser or an amplifier.

Additionally, photo-darkening is a phenomenon where background loss in a fiber is permanently increased by creation of color centers as a consequence of large amount of optical power's presence in the fiber. Photo-darkening is generally believed to be linked to ytterbium clustering at high ytterbium doping levels, where multiple ions interact to produce photons with very high energy level to cause photo-darkening. Although the effect can be saturated after a period of exposure, it contributes to loss of output power and reduction of efficiency in fiber laser and amplifiers. Photo-darkening is more severe at high power level; it can contribute to a significant power loss in a high power fiber laser system if not dealt with appropriately.

Adding aluminum and phosphorus to reduce ytterbium clustering, however, has the effect of raising refractive index. Small amounts of germanium-doping can be added to raise refractive index if required. Fluorine can be added to lower refractive index. Due to the limited amount of fluorine which can be incorporated into silica glass by current state of art silica fiber fabrication techniques, rare earth doped core typically has refractive index higher than that of the silica. This is especially true for highly rare earth doped core, since the required doping level for aluminum or phosphorus is higher to achieve a reasonably low level of clustering, in addition to the index increase from rare-earth-doping. Accordingly, producing highly rare earth doped core glass, which is used for the power scaling of fiber lasers in the certain large core fiber designs, that have a refractive index close to that of the silica, is particularly difficult.

Various embodiments described herein, however, include highly rare earth doped glass compositions having a refractive index close to that of silica. Such glasses can be fabricated into rods that can be used a performs to produce other rods as well as optical fiber. Moreover, such glasses can be fabricated with mature technologies used in the manufacture of optical fibers in telecommunications industry.

One embodiment shown in FIG. 1, for example, comprises a glass rod or perform 2 comprising a glass composition with high levels of rare earth ions, e.g. >1000 mol ppm, with refractive index very close to that of the silica glass, e.g. index difference $\Delta n < 1 \times 10^{-3}$. In this embodiment, the mostly silica glass has significant levels of phosphorus, e.g., 10-50 mol % phosphorus, and boron, e.g. 8-50 mol % boron. In various embodiments, the phosphorus and boron are in a phosphorus or boron containing compound. The mostly silica glass may, for example, comprises 5-25 mol % $P_2O_5$, and 4-25 mol % $B_2O_3$. An elemental analysis, e.g., using a mass spectrometer or SEM, may be used to determine glass composition. It has been found that such glass compositions allow ytterbium doping levels up to 20,000 mol ppm without devitrification and enable highly efficient laser and amplifier actions. It has been discovered that photo-darkening effect is substantially lower in the fabricated fibers for equivalent amount of ytterbium doping level. The use of this glass can reduce photo-darkening and lead to much more stable and efficient high power fiber lasers and amplifiers.

Various embodiments described herein also include techniques for fabricating doped fiber core with extremely high effective refractive index uniformity. This high uniformity can be achieved by fabricating a large number of rare earth doped performs having core and cladding. The average refractive index of the doped core glass is fabricated to be very close to that of the silica glass. The cladding glass of the preforms may be totally or partially removed by grinding or drilling. The result can be a rod such as shown in FIG. 1. The resulting rods are stacked and the stack is drawn into a smaller size rod while ensuring substantial fusion of constituent rods in the stack. The stack can optionally be inserted into a tube before drawing. The drawn rod can be cut and re-stacked with other similar rods and drawn again following a similar procedure. This process can be repeated many times to obtain a homogenous rod at the end. In the final fiber, the doped glass may be further mixed by flow and diffusion of the low viscosity rare earth doped glass at the high drawing temperature. In the alternative arrangement where the stack is inserted into a tube, an additional step may be added to fuse the structure. Part or all of the tube may then be removed by grinding or etching before drawing into rods.

In contrast to other doped glasses, this rare earth doped glass described herein allows refractive index very close to that of the silica glass to be made. Furthermore, highly uniform rare earth doped core glass can be made by repeated stack-and-draw of the same type of glass rods instead of two types of glass rods used in other methods. This approach further improves glass uniformity and allows high effective rare-earth-doping levels in the fiber core.

Various fibers and processes for fabricating fibers formed by stacking and canning performs are described in greater detail below. Processes of fabricating the performs are also described. Processes for fabricating performs, fibers, and other structures will be described in detail by way of examples and illustrations. Wide variation in the processes and resultant and intermediate products, however, are possible. Processing steps may be added, removed, or reordered. Similarly, components may be added, removed, or configured differently or in different amounts. In particular, starting constituents and added components may be varied.

The preform fabrication technique used in the following examples is modified chemical vapor deposition (MCVD), although other known vapor deposition techniques such as, e.g., outside deposition process can also be used. Silicon and phosphorus are introduced to the deposition zone through the conventional bubblers arrangement with liquid precursors, e.g., $SiCl_4$ and $POCl_3$ respectively. Boron is introduced into the deposition zone through a gas precursor, e.g., $BCl_3$. Fluorine is also used and is introduced through $CF_4$. Rare earth ions are introduced through the well known solution-doping process.

Figure 2A:
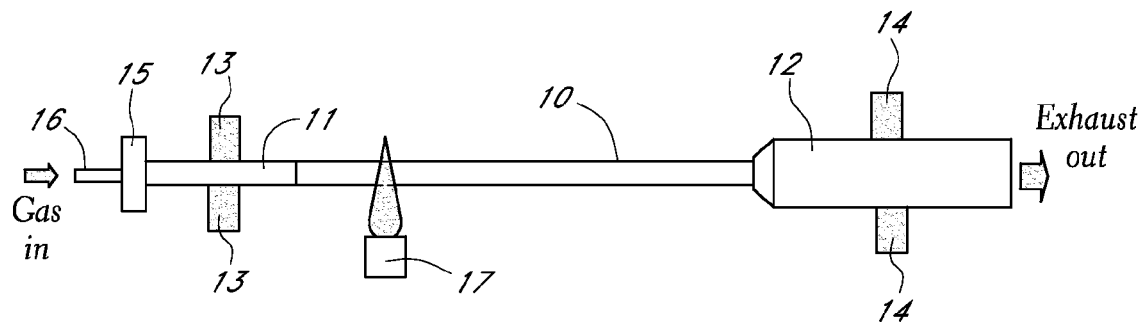
FIG. 2A schematically illustrates an apparatus for Modified Chemical Vapor Deposition (MCVD) on a surface of a tube.

At an early stage of the process, a substrate tube 10 of 25 mm outer diameter and 19 mm inner diameter is cleaned and placed on a lathe of a MCVD system as illustrated in FIG. 2A. A standard MCVD system manufactured by Nextrom Technologies, Vantaa, Finland, for optical fiber manufacturing is used in this example, although other systems may be employed. The substrate tube 10 is joined with a starting tube 11 of similar diameter at a first end and a soot tube 12 of larger diameter at a second end. The starter tube 11 is held by chucks 13 and is connected to gas inlet line 16 through rotational seal 15. Soot tube 12 is also held by chuck 14. The soot tube 12 is connected to a scrubber which processes the exhaust gas before releasing. A traveling burner 17 which moves along the substrate tube 10 can heat a portion of the substrate tube at a time. When the burner 17 reaches the end of the substrate tube 10 near the joint with the soot tube 12, it quickly moves to the beginning of the substrate 10 near the joint with the starter tube 11. It will be ready for next pass along the substrate tube 10. The chucks 13, 14 rotate at a rate of 40 rpm.

The substrate tube 10 is initially cleaned with an etching pass where 200 sccm of $CF_4$ is used to remove a layer of glass from the inner surface of the substrate tube 10. One or more optional cladding passes are used to deposit a cladding with refractive index close to the substrate tube, which may comprise silica. A flow of 500 sccm $SiCl_4$, 300 sccm $POCl_3$ and 10 sccm $SF_6$ may be used to form a cladding.

Figure 2B:
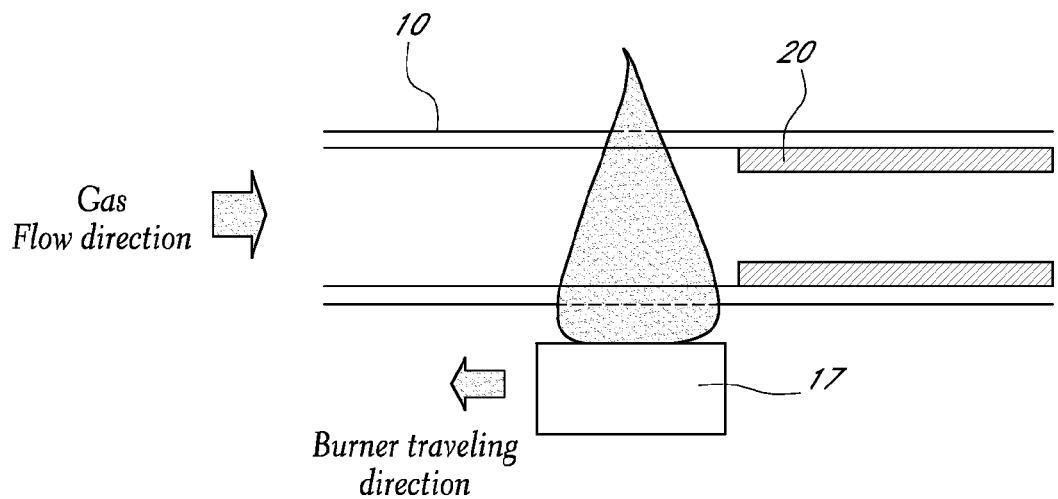
FIG. 2B schematically illustrates deposition of core soot in the tube shown in FIG. 2A.

A core layer is deposited by moving the burner 17 upstream from the soot tube end as illustrated in FIG. 2B. The burner 17 moves upstream ahead of the soot formation so that the burner will not go over the core soot 20 to avoid any soot sintering as shown in FIG. 2B. In certain embodiments, the flow used for the core formation is 100 sccm $SiCl_4$, 500 sccm $POCl_3$ and 200 sccm $CF_4$. During the core pass, the burner 17 travels from the soot tube end to the starting tube end at 20 mm/min to encourage soot formation. For the burner, 47 slm of hydrogen and oxygen/hydrogen ratio of 0.45 are used. The core layer is then followed with a pass to consolidate the core soot 20 by heating it to 1300° C.

The substrate tube 10 is then removed from the lathe to soak the core soot 20 in $YbCl_3$ solution to incorporate ytterbium into the soot layers. After 1 hour of solution-doping, the solution is drained and the substrate tube 10 is placed back on the lathe. The substrate tube is dried for a few hours by passing nitrogen and heating the substrate tube up to ~1000° C. The core soot 20 is sintered by heating it to 1750° C. with a BCl$_3$ flow of 10-150 sccm. After the sintering pass, the substrate tube 10 goes through a collapse process with some level of POCl$_3$ over-doping, where the burner temperature is significantly raised and burner speed lowered. The surface tension of the tube reduces the tube outer diameter during the collapse process. In some embodiments, 3-5 collapse passes are used. The tube is totally collapsed into a rod at the end. A solid preform with ytterbium-doped core is obtained. In this embodiment, the boron and phosphorous are introduced at different times thereby reducing the likelihood of the reaction of boron and phosphorous in vapor phase.

Figure 2C:
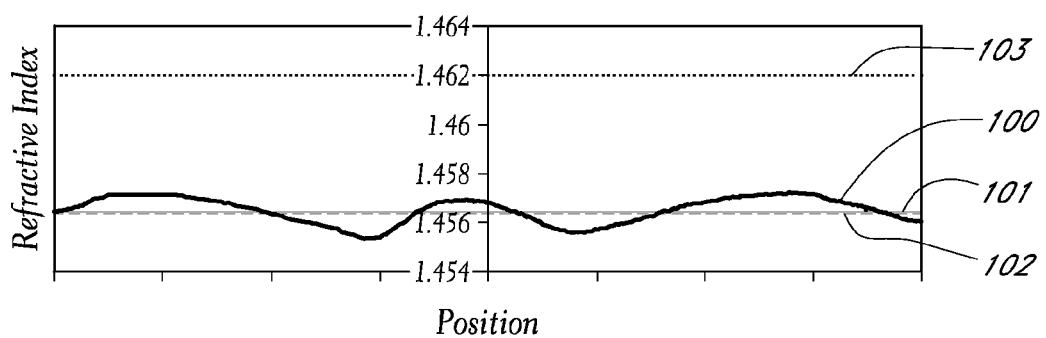
FIG. 2C is a plot of (a) the refractive index across a core region of a glass perform comprising ytterbium doping, (b) the average refractive index of the glass, (c) the refractive index of silica, and (d) an example of the average refractive index of a conventional silica preform with similar ytterbium doping level.

Curve 100 in FIG. 2C illustrates the refractive index profile over the core part of a fabricated ytterbium-doped preform. The average refractive index of this preform over the core is shown by line 101 along with the target refractive index of silica shown as line 102. The average refractive index of the preform over the core shown as 101 can be made to be within $\pm 1 \times 10^{-4}$ of the target refractive index shown as 102. An example of the average refractive index made with conventional silica host is illustrated by line 103, which is much higher. The significant increase in matching is produced by the much larger amount of B$_2$O$_3$ level incorporated in the glass, which lowered the refractive index of the doped glass.

The core is doped with 3500-17500 mol ppm of Yb$^{3+}$ ions, giving absorption of 300-1500 dB/m at 976 nm. In this example, the core is further doped with 15-25 mol % of P$_2$O$_5$, 0.1-0.5 mol % F and 10-25 mol % B$_2$O$_3$. For a 50 μm core fiber, in certain embodiments, the difference of the average refractive index and that of the silica, $\Delta n = n - n_{silica}$, is larger than $-5 \times 10^{-3}$ and smaller than $5 \times 10^{-4}$ at a wavelength of 1 μm. The photo-darkening effect is also substantially reduced in the fabricated fibers for equivalent amount of ytterbium doping level possibly at least in part because of the inclusion of phosphorus, which prevents ytterbium clustering. Variation in the parameters used to fabricate the fiber may be used and the results may also vary.

Figures 3A, 3B:
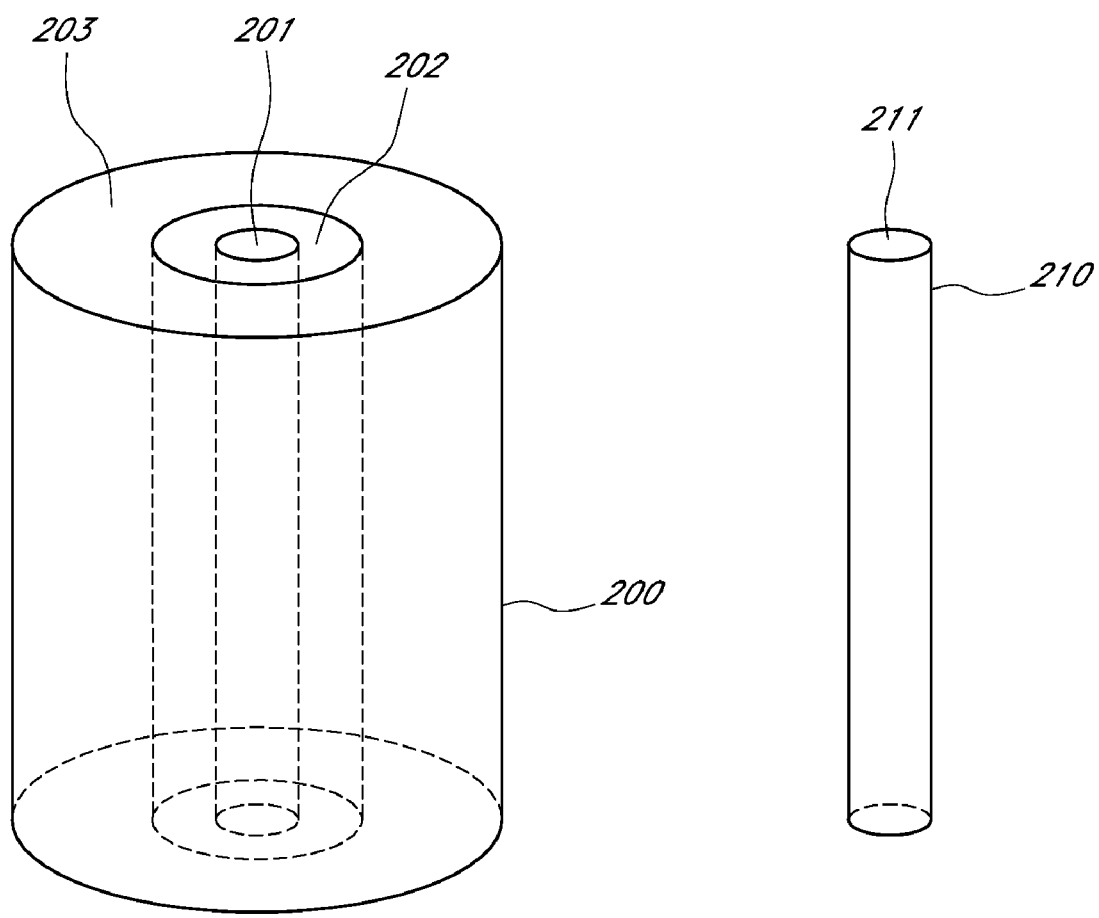
FIG. 3A schematically illustrates a preform structure such as can be fabricated by the apparatus shown in FIGS. 2A and 2B.
FIG. 3B schematically illustrates a rod fabricated by removing parts of the preform of FIG. 3B that do not contain ytterbium.

FIG. 3A illustrates the structure of a preform 200 comprising of a core 201, an optional deposited cladding layer 202 and silica glass layer 203 from the substrate tube 10 that may be fabricated in a process described above with reference to FIGS. 2A-2C. FIG. 3B further illustrates the core rod 210 made from the preform 200 by removing silica layer 203, deposited cladding layer 202 and perhaps small part of the core 201. Cross-section 211 includes all or part of core 201. In an alternative embodiment, rod 211 contains part of the cladding layer 202.

The repeated stack-and-draw process starts with fabrication of multiple preforms with rare earth doped core. The preforms are then grinded to remove the silica layer 203 and totally or partially to remove deposited cladding layer 202 to produce multiple of core rods 210 comprises mostly rare earth doped core glass. Etching away glass layers which do not contain ytterbium and drilling out the doped core can be used for this purpose as example alternatives.

Figure 4A:
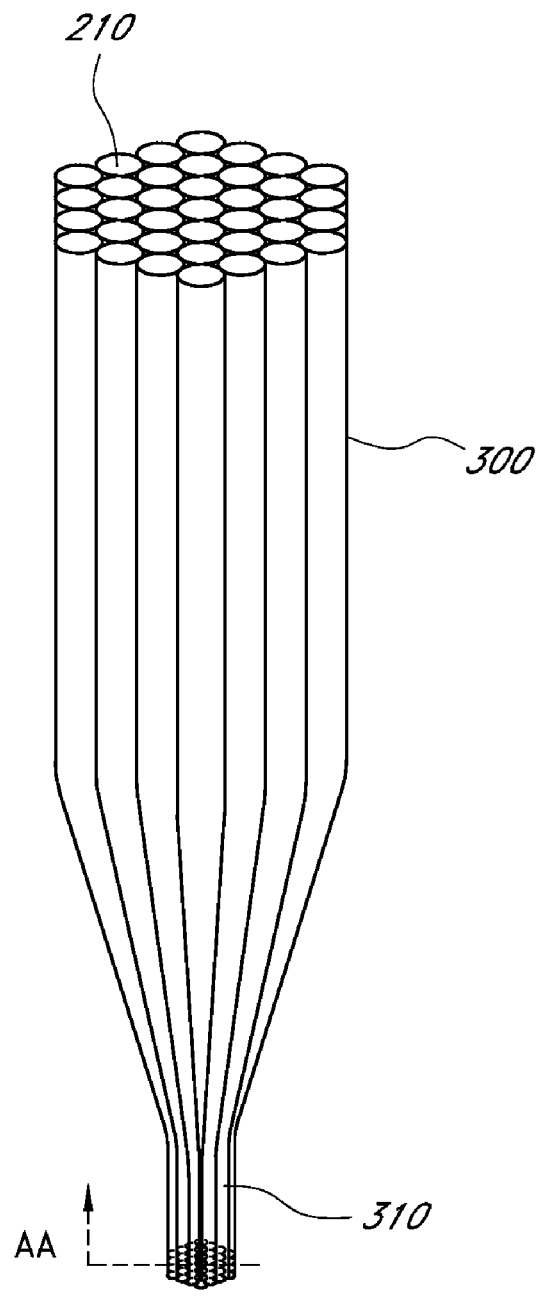
FIG. 4A schematically illustrates a stack of ytterbium-doped rods and canning of the stack.

The doped core rods 210 can then be stacked as illustrated in FIG. 4A. Hexagonal stack 300 shown in FIG. 4A may be used due to its high packing density, although other stacking arrangement can also be used. The two ends of the stack 300 are fused while the stack is held in place. The fused ends can then hold the shape of the stack 300 during caning. Fusing the entire stack 300 is optional. The doped core rods 210 can also be joined with undoped rods at one or both ends to reduce wasting doped core rods in the subsequent caning process illustrated in FIG. 4A. The stack 300 can then be caned into a single rod 310 by choosing appropriate drawing conditions for fusing all the rods in the stack. The stack 300 can also be inserted into a tube (not shown in FIG. 4A) before drawing.

Figure 4B:
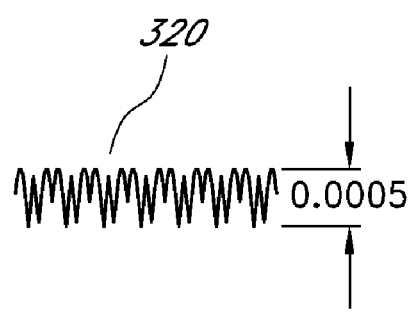
FIG. 4B is a plot of the refractive index profile across the line AA in FIG. 4A.

The tube can help holding stack 300 in place during drawing. The caned rod 310 has a substantially fused cross-section. FIG. 4B show a refractive index profile 320 across a cross-section along AA shown in FIG. 4A. The refractive index profile 320 comprises mainly the refractive index of the original core rods 210 scaled down in dimension. Flow and diffusion can occur at higher canning temperatures. Peaks and valleys of the refractive profile of the original rods 210 can be substantially smoothed out.

Figure 5A:
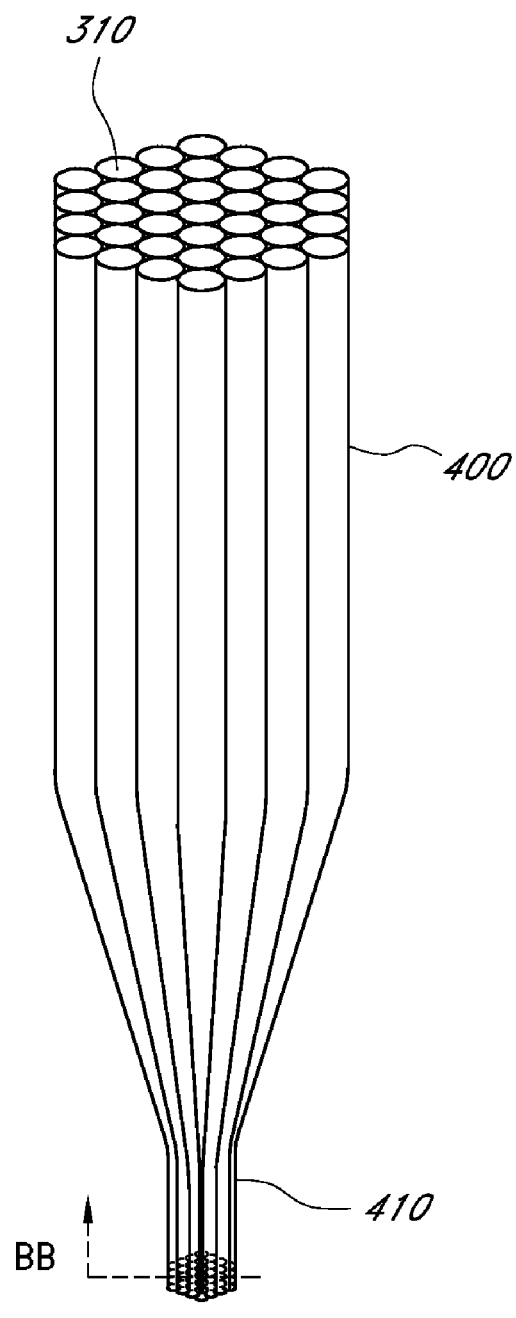
FIG. 5A schematically illustrates a stack formed by canes produced in the process shown in FIG. 4A and canning of the stack.
Figure 5B:
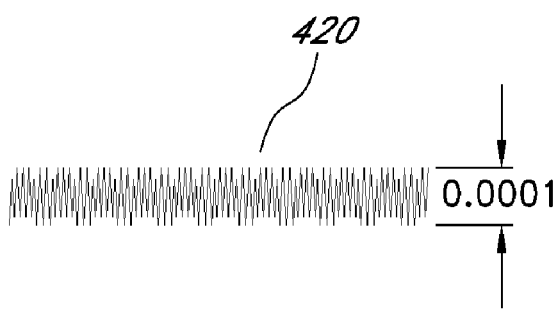
FIG. 5B is a plot of the refractive index profile across the line BB in FIG. 5A, which shows the increased uniformity and refractive index.

The cane 310 can then be cut into multiple sections and stacked again to form stack 400 for a repeated process illustrated in FIG. 5A. This process can be repeated many times. FIG. 5B shows a refractive index profile 420 along line BB of the resulting cane 410 of FIG. 5A. The refractive index profile 420 comprises mainly the refractive index profiles of original canes 310 scaled down in dimension. Again, the refractive index profile 420 (viewed along BB) can be substantially smooth out by flow and diffusion if caning temperature is high. This can create a more uniform refractive profile. At least two stages are used in some embodiments as the second stage can eliminate inconsistency in the fabricated preforms. In the stack examples in FIGS. 4A and 5A, a stack of 37 rods are used. Other stack sizes can also be used. The number of rods used in each stage does not need to be the same. The arrangement may also vary in different embodiments.

Figure 6:
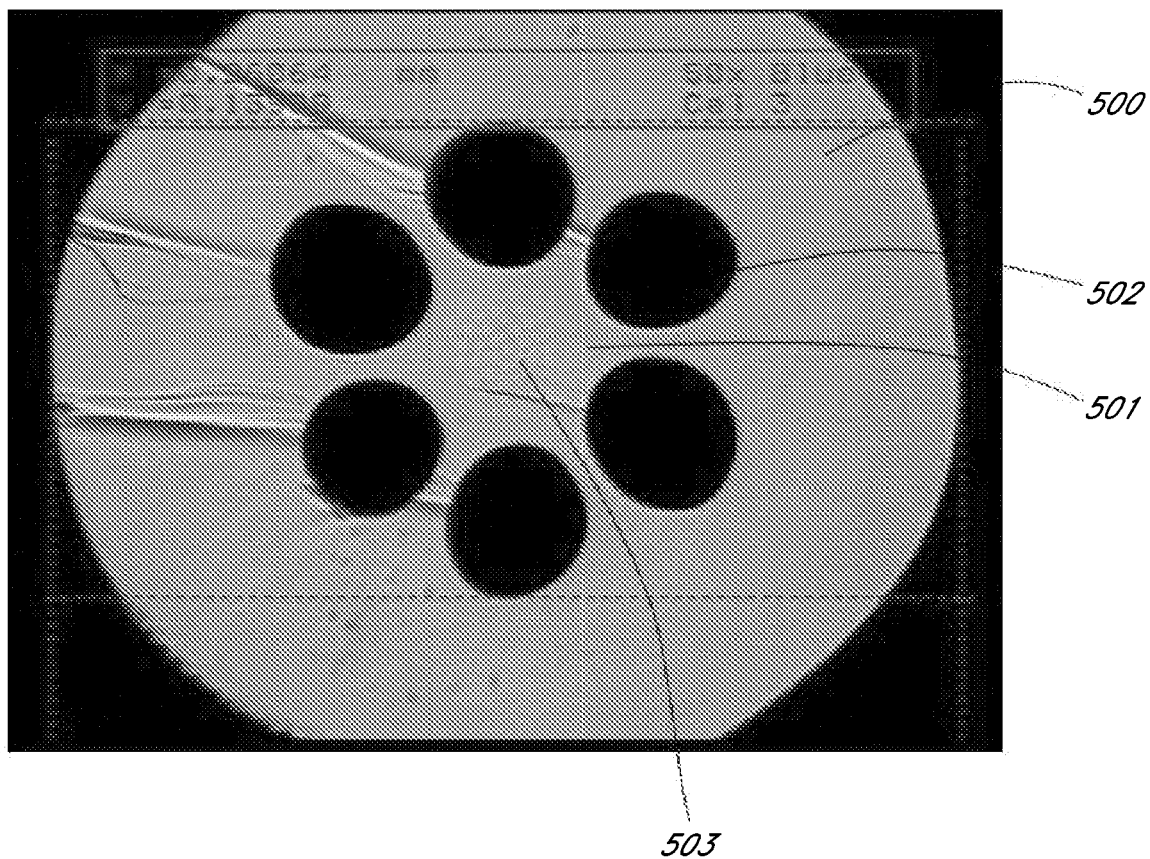
FIG. 6 is a photograph of the cross-section of a leakage channel fiber with an ytterbium-doped core fabricated using techniques such as those disclosed above with regard to FIGS. 4A, 4B, 5A, and 5B.

In another example of this process, the stack is inserted into a tube before drawing in each stage of a two-stage process. Additionally, an extra step can be used to fuse the stack and the tube prior to drawing. The tube may then be totally or partially removed by grinding or etching. Additionally, the doped rod is incorporated into a core region of a large core fiber. Such a fiber may be fabricated by stacking the doped core together with undoped rods as well as with hollow (undoped) rods and drawing. A cross-section of a fiber 500 thereby produced is shown in FIG. 6. The fiber 500 includes 6 holes 502, which defines a core 501. The 6 holes may be formed from six hollow rods used in the drawing process. Other processes and configurations may be used. The doped part of the core 503 comprises the doped rods fabricated by the repeated stack-and-draw process such as described above with regard to FIGS. 4A and 5A, which shows first and second stacks, respectively. Each of the rods used in the second stack are visible because the optional silica tube used in the first stack has slightly lower refractive index than that of the ytterbium-doped glass.

In the embodiment shown in FIG. 6, silica glass is used as the matrix for the doped rods as well as for the holes 502 in the holey fiber 500. In various other embodiments, silica may be used as the matrix for doped rods and/or for the holes in holey fiber. Accordingly silica may be used as a matrix for the doped regions in the core 503 and may also be used as matrix material for creating the cladding. Other materials may also be used as the matrix material in other embodiments. Additionally, different matrix materials may be used for any of the core or cladding regions, for example, to surround the doped regions (e.g., rods) or the holes in holey fiber.

Figure 7A:
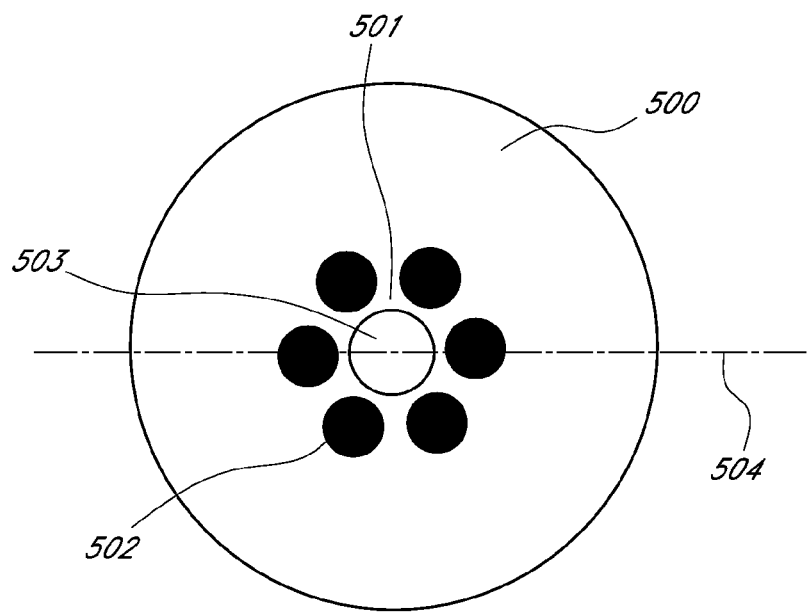
FIG. 7A schematically illustrates the cross-section of a leakage of fiber such as shown in FIG. 6.
Figure 7B:
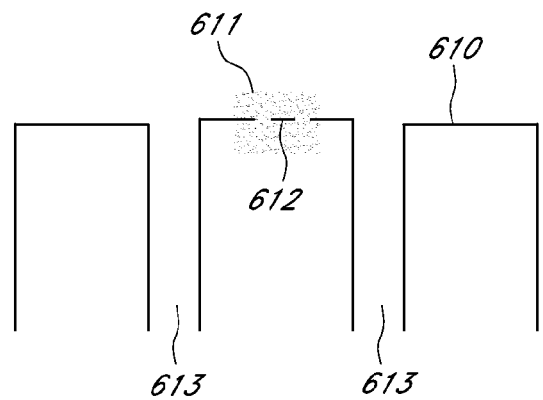
FIG. 7B schematically illustrates the refractive index profile across the fiber of FIG. 7A formed using ytterbium-doped rods having an average refractive index matched to that of silica, which is used to form the cladding.
Figure 7C:
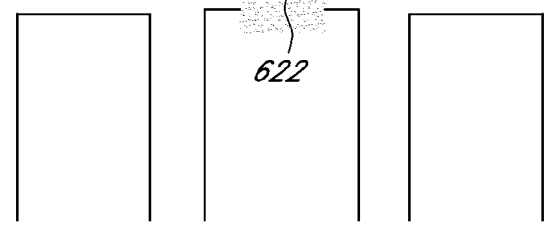
FIG. 7C schematically illustrates the refractive index profile across the fiber of FIG. 7A formed using ytterbium-doped rods having an average refractive index higher than that of silica, which is used to form the cladding.
Figure 7D:
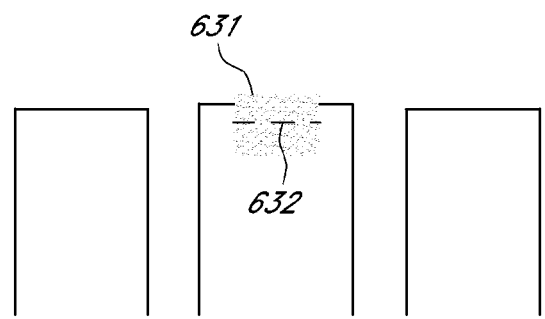
FIG. 7D schematically illustrates the refractive index profile across the fiber of FIG. 7A formed using ytterbium-doped rods having an average refractive index lower than that of the silica, which is used to form the cladding.

FIGS. 7A-7D illustrates various embodiments where the doped core rods are chosen to have a different average refractive index. FIG. 7A illustrates a leakage channel fiber 500 with 6 holes 502, which form a core 501. Part 503 of core 501 is made from the doped rods. FIGS. 7B, 7C, and 7D are illustrated refractive index profiles along line 504 in FIG. 7A where the doped core has an average refractive index equal to, higher than and lower, respectively, than refractive index of the silica glass used.

FIG. 7B show a refractive index 611 of the doped part 503 of the core 501 with an average index 612 that is matched to that of the silica glass 610. The refractive index 613 of air is also shown in FIG. 7B. FIG. 7C shows the refractive index 621 of the doped part 503 of the core 501 with an average index 622 that is higher than that of the silica glass 610. In this case, there will be an additional waveguide due to this high average refractive index. In certain embodiments, the difference of the average refractive index and that of the silica, $\Delta n = n - n_{silica}$, is small enough so that $V = 2\pi \rho NA/\lambda$, is kept below about 6, where $\lambda$ is optical wavelength, $\rho$ is core radius and $NA = (n^2 - n_{silica}^2)^{1/2} \approx n_{silica}(2\Delta n/n_{silica})^{1/2}$. In various embodiments, V is below about 2.4 so that higher order modes are not supported in this additional waveguide. In the case where this additional waveguide is created by the localize increase index, holes 502 can be reduced to reduce overall waveguide effect to reduce higher order mode propagation. The gap between holes provide leakage channels. Either hole size or/and number can be reduced to increase leakage. Higher order modes can thereby be leaked and few or single mode fiber provided.

FIG. 7D shows the refractive index 631 of the doped part 503 of the core 501 with an average index 632 that is lower than that of the silica glass 610. In this case, there will be an additional negative waveguide due to this low average refractive index. In various embodiments, the difference of the average refractive index and that of the silica, $\Delta n = n - n_{silica}$, is larger than $-0.005$ so that it does not cancel the waveguide effect from holes 502, may be larger than $-0.001$. In the case where this additional negative waveguide is present, holes 502 can be increased to increase overall waveguide effect. Either hole size or number may be increased.

Figure 8:
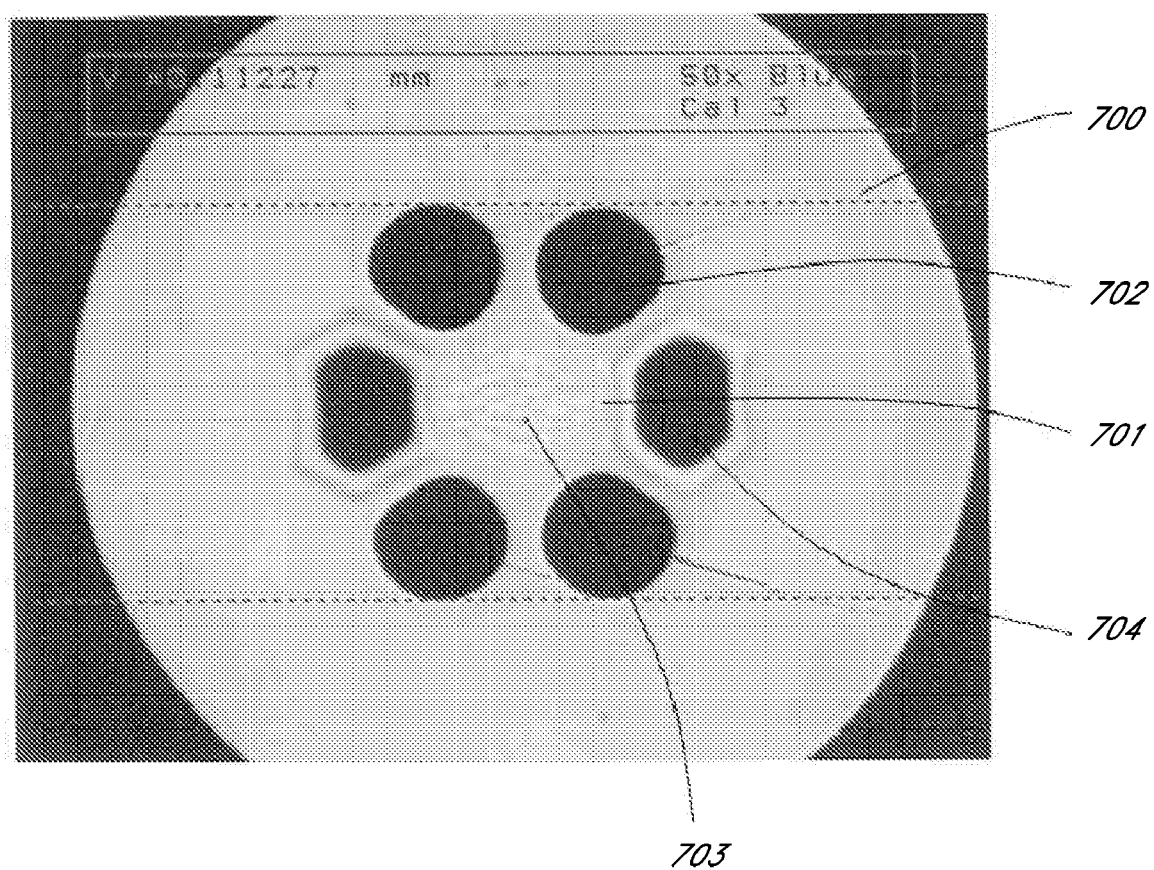
FIG. 8 is a photo of the cross-section of a large core polarization maintaining (PM) fiber including an $Yb^{3+}$-doped core.

FIG. 8 illustrates a cross-section of a polarization maintaining (PM) fiber 700 incorporating two stress elements 704, in addition to 4 holes 702. The core 701 comprises a doped portion 703 formed using doped rods such as those fabricated using processes described with reference to FIGS. 4A and 5A.

In the embodiment shown in FIG. 8, silica glass is used as the matrix for the doped rods, the two stress elements 704 as well as for the holes 702 in the holey fiber 500. Accordingly, in various other embodiments, silica may be used as the matrix for doped rods, stress elements, and/or for the holes in holey fiber. Silica may be used as a matrix for the doped regions in the core 703 and may also be used as matrix material for creating the cladding. Other materials may also be used as the matrix material in other embodiments. Additionally, different materials may be used in any of the core or cladding regions, for example, as the matrix for the doped regions (e.g., rods), the holes in holey fiber, stress elements, or other components.

Accordingly, although silica glass and air holes are used in the above examples, many different transparent optical media with different refractive indexes can be used to implement the design. For an example, a soft glass can replace silica and a different soft glass with a lower refractive index can be used to replace the air holes. Rare earth ions other than ytterbium can also be used. Still other variations, for example, in configuration, materials, dimensions, or in other design parameters are possible.

Figure 9A:
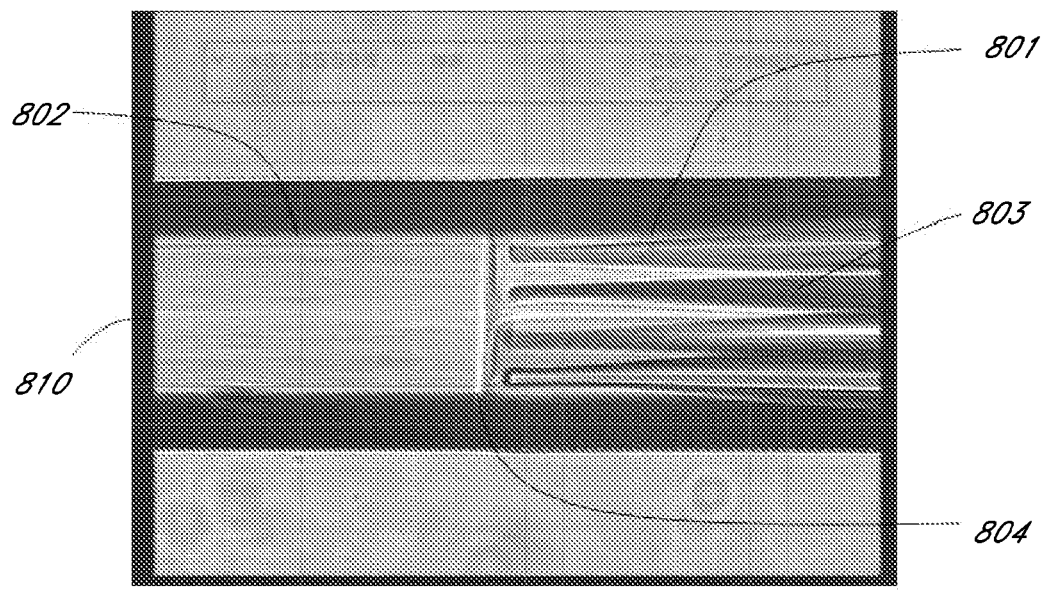
FIG. 9A schematically illustrates a fiber end facet prepared by splicing with a coreless fiber.
Figure 9B:
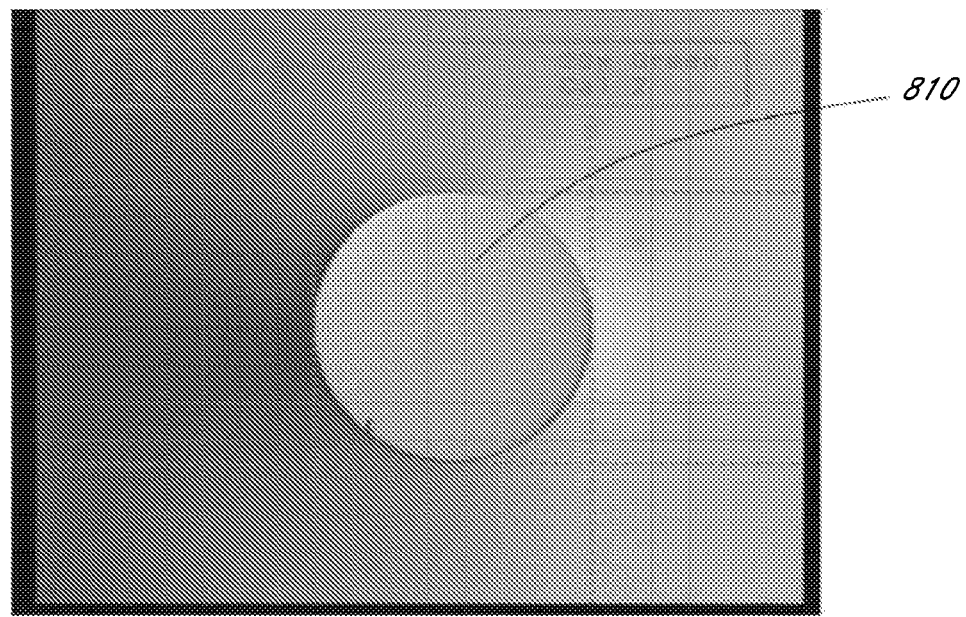
FIG. 9B schematically illustrates the coreless fiber of FIG. 9A cleaved to form the end facet.

Undesirable cracks can occur during cleaving due to the presence of the large holes. Cracks can make a cleaved end face unsuitable for use. In addition, for various applications, there is a need to seal the holes at fiber ends, for example, to prevent contaminants from entering the holes. A number of techniques can be used to resolve these issues. In one embodiment shown in FIG. 9A, a coreless fiber 802 is spliced to a large core holey fiber 801. The coreless fiber 802 is then cleaved to form the end facet 810. The cross-section of the cleaved end facet 810 is shown in FIG. 9B. Splice point 804 and holes 803 are clearly shown in FIG. 9A. The coreless fiber may also serve as an end cap for beam expansion if placed at the output of an amplifier. The end cap provides a uniform media where the beam can expand before exiting the glass. This beam expansion can advantageously reduce optical intensity at the glass/air interface to reduce or minimize end face damage.

Figure 10A:
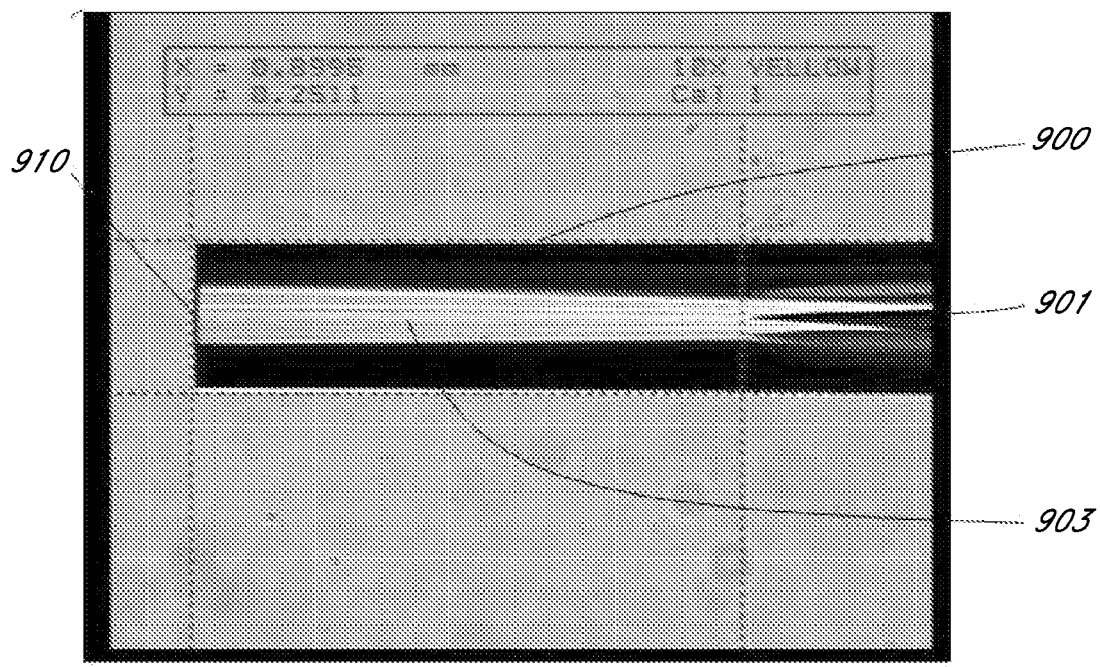
FIG. 10A schematically illustrates a fiber end facet prepared by collapsing holes in a large core fiber.
Figure 10B:
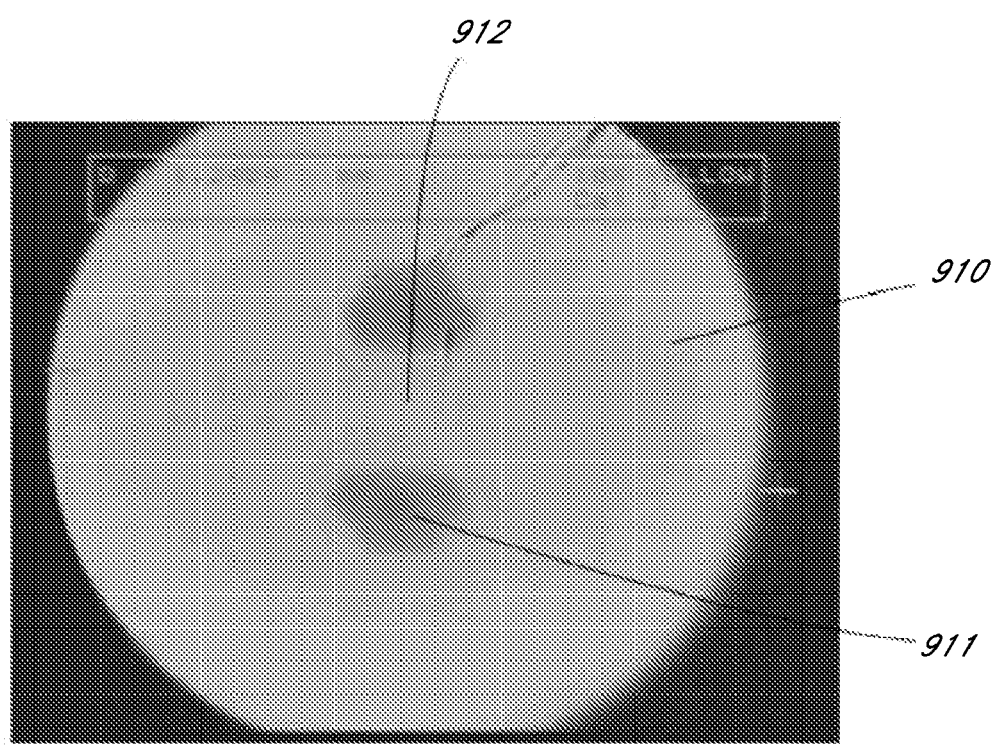
FIG. 10B schematically illustrates the coreless fiber of FIG. 10A cleaved to form the end facet.

In another approach, holes 901 in a holey fiber 900 are totally collapsed into a solid fiber 903 by heating a section of the holey fiber to a temperature at least as high as the glass softening temperature. The fiber 900 can then be cleaved in the collapsed portion to form an end facet 910 such as shown in FIG. 10A. FIG. 10B illustrates a cross-section of the collapsed and cleaved end facet 910 of a PM fiber. Stress elements 911 are visible on the fiber cross-section illustrated in FIG. 10B. Doped rods such as described above are also visible in the doped section 912 of the core.

Figure 10C:
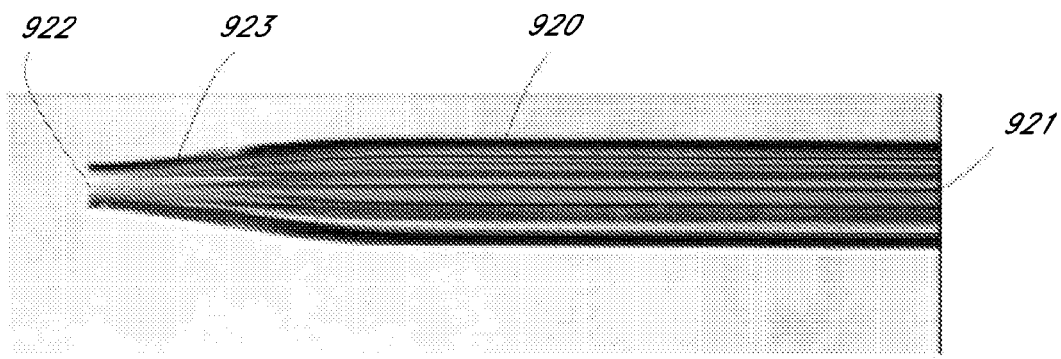
FIG. 10C schematically illustrates a fiber end facet prepared by tapering and collapsing holes in a large core fiber.
Figure 10D:
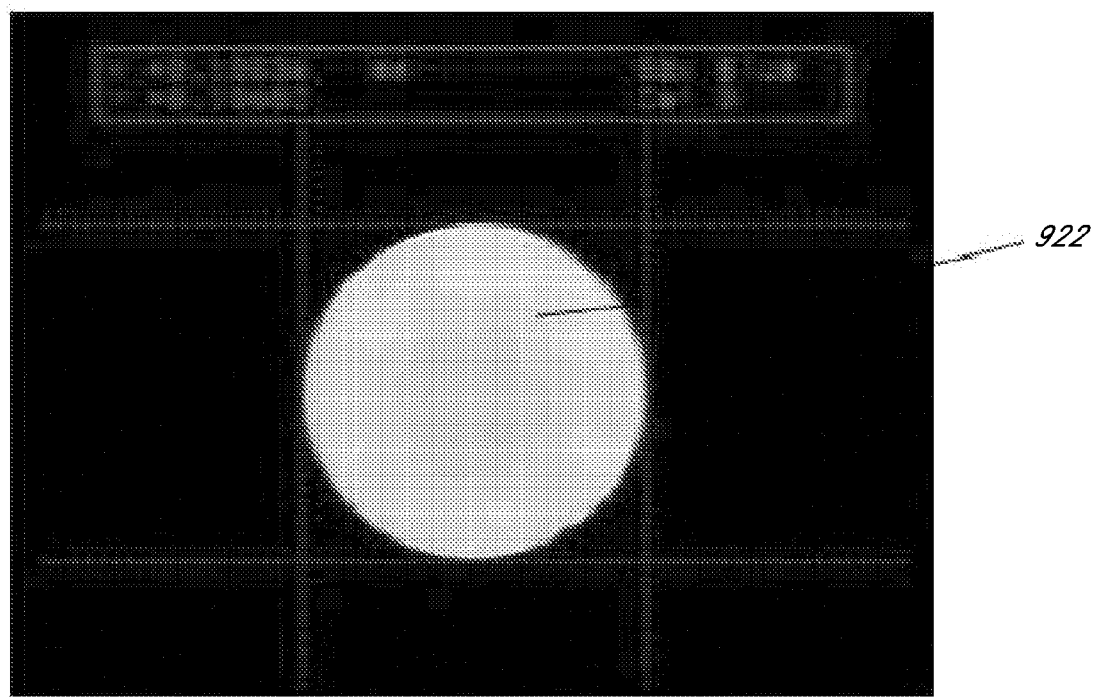
FIG. 10D schematically illustrates the tapered fiber of FIG. 10C cleaved to form the end facet.

FIG. 10C illustrates a further technique where a holey fiber 920 with holes 921 is tapered and then collapsed. Drawing and/or heat can be used to create the taper and collapse the holes 921, although the process should not be so limited. The holey fiber 920 has a taper 923 and a cleaved and tapered end 922. The end facet 922 in this case is shown in FIG. 10D. This taper 923 supports smaller number of modes and can further help increase transmission loss for higher order modes, especially when placed at the input end of an amplifier. Such input taper can also help efficiently launch optical power into the core.

The repeated stack-and-draw process described herein for making a doped core with extremely high effective refractive index uniformity can also be used in conventional step index fiber as well as photonic crystal fiber. In various embodiments wherein repeated stack and draw to produce doped core regions in conventional step index fibers, the average refractive index of the doped preform core can be made to be slightly higher than that of the cladding glass. The doped perform may comprise, for example, doped rods that form part of the core of the fiber. In certain embodiments, the final rod made from the plurality of doped rods is inserted into a tube comprising the cladding glass.

Figure 11:
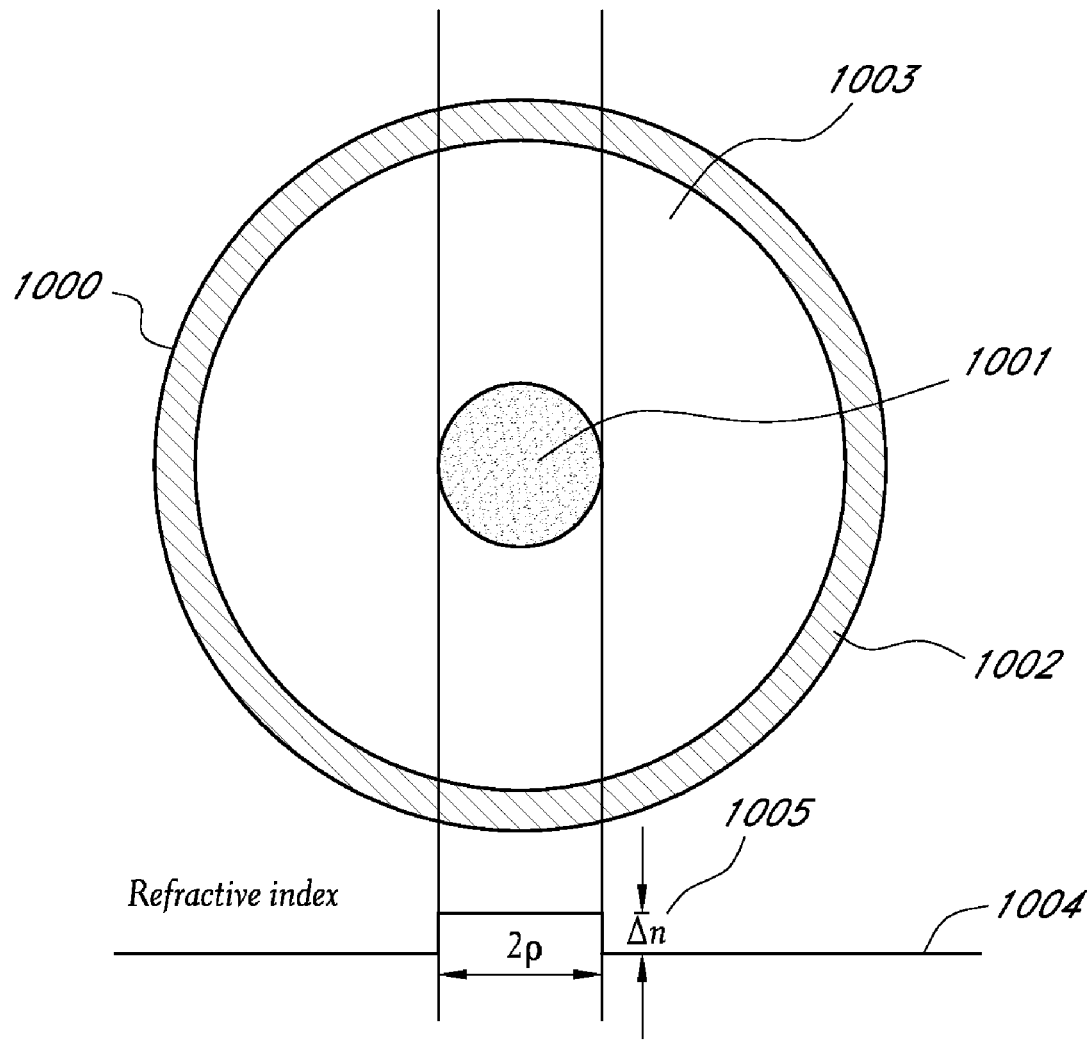
FIG. 11 schematically illustrates a step-index fiber design incorporating a rare earth doped core fabricated with a stack-and-draw process such as described herein with an average refractive index higher than that of the silica cladding.

A fiber 1000 is shown in FIG. 11, where the doped core 1001 is made from the repeated stack-and-draw process. As described above, the doped core 1001 may be formed from a plurality of doped rods. A cladding layer 1003 comprises cladding glass. The fiber 1000 is further coated with a coating 1002.

A refractive index profile 1004 shows the refractive index difference between the doped core and cladding glass, $\Delta n$. The doped core having very high effective refractive index uniformity can improve mode quality and ease of use and can also allow smaller $\Delta n$ to be used. In many current designs, $\Delta n$ is chosen to be larger than $1 \times 10^{-3}$, affected to some extent by the refractive index uniformity, repeatability of the fabrication process, and fundamental mode bend loss. Smaller $\Delta n$ will allow larger core diameter to be implemented. For example, mode quality in a 30 μm core fiber can be achieved in a 50 μm core fiber if $\Delta n$ is reduced by a factor of $(50/30)^2 \approx 2.8$. Since bending loss is dependent on $\Delta n$, higher bending loss is expected for lower $\Delta n$ for the same core size. In certain embodiments, single mode fiber is possible at ~1 μm wavelength for 50 μm core diameter if $\Delta n$ can be reduced to below $8 \times 10^{-5}$, e.g. a $NA \leq 0.015$, with a compromise of bending performance. However, values outside these ranges are also possible.

Figure 12:
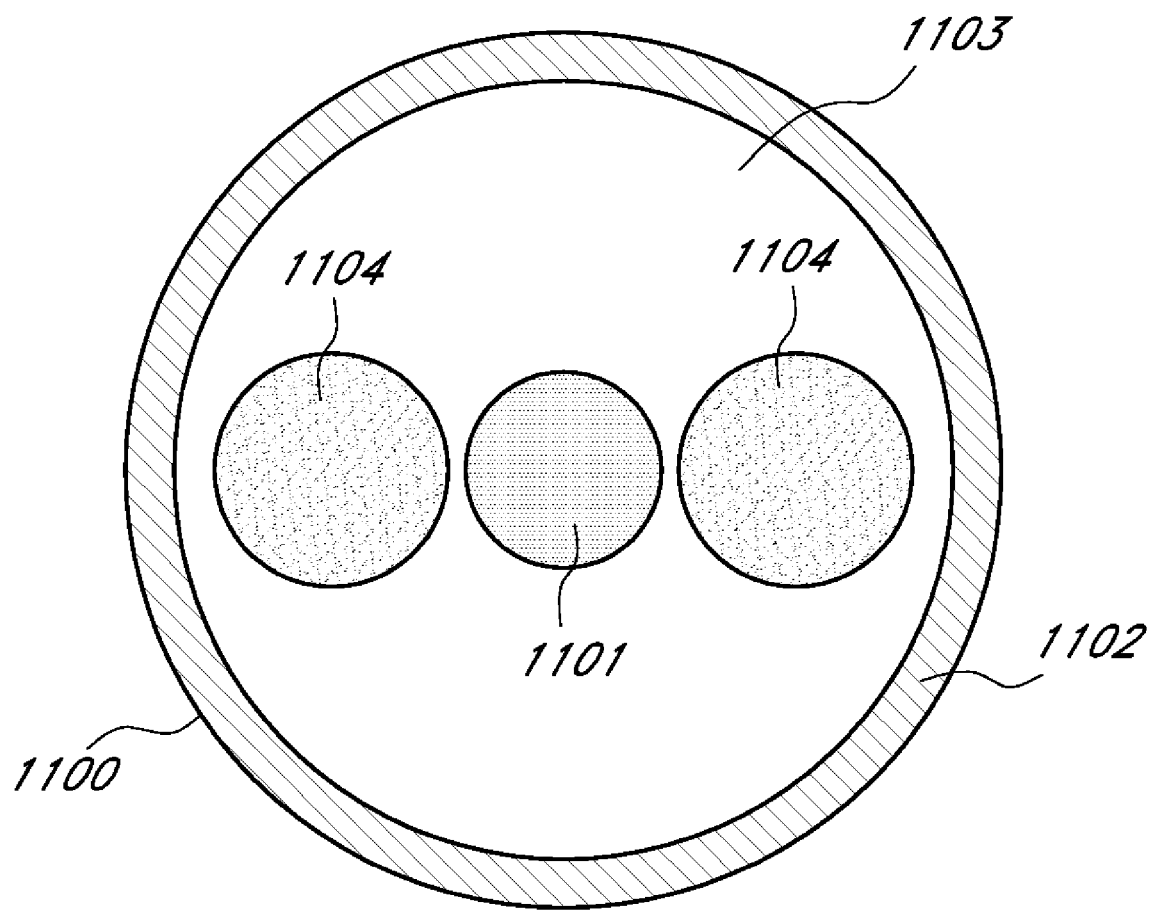
FIG. 12 schematically illustrates a polarization maintaining (PM) step-index fiber design incorporating a doped core fabricated with a stack-and-draw process such as described herein with an average refractive index higher than that of the silica cladding.

As shown in FIG. 12, Stress rods 1104 can be included in the cladding 1103 of a fiber 1100 to make large core polarization maintaining (PM) fiber with a highly uniform doped core 1101. An additional cladding layer with lower refractive index than that of 1103 can also be added between cladding 1103 and coating 1102 to form a pump guide in a double cladding fiber structure. Coating 1102 can also be chosen to be of low refractive index to form a double cladding structure. It is also possible to dope only part of the core 1101 and use a similar stack-and-draw technique to make the rest of the core with a highly uniform refractive index. Such selective doping of part of the core can be used to further improve mode selection in a fiber.

As described above, smaller $\Delta n$ in a conventional fiber allow larger core diameter to be used. However, higher bending loss is expected for lower $\Delta n$. Various embodiments, described herein also provide designs for reducing this bending loss.

Figure 13:
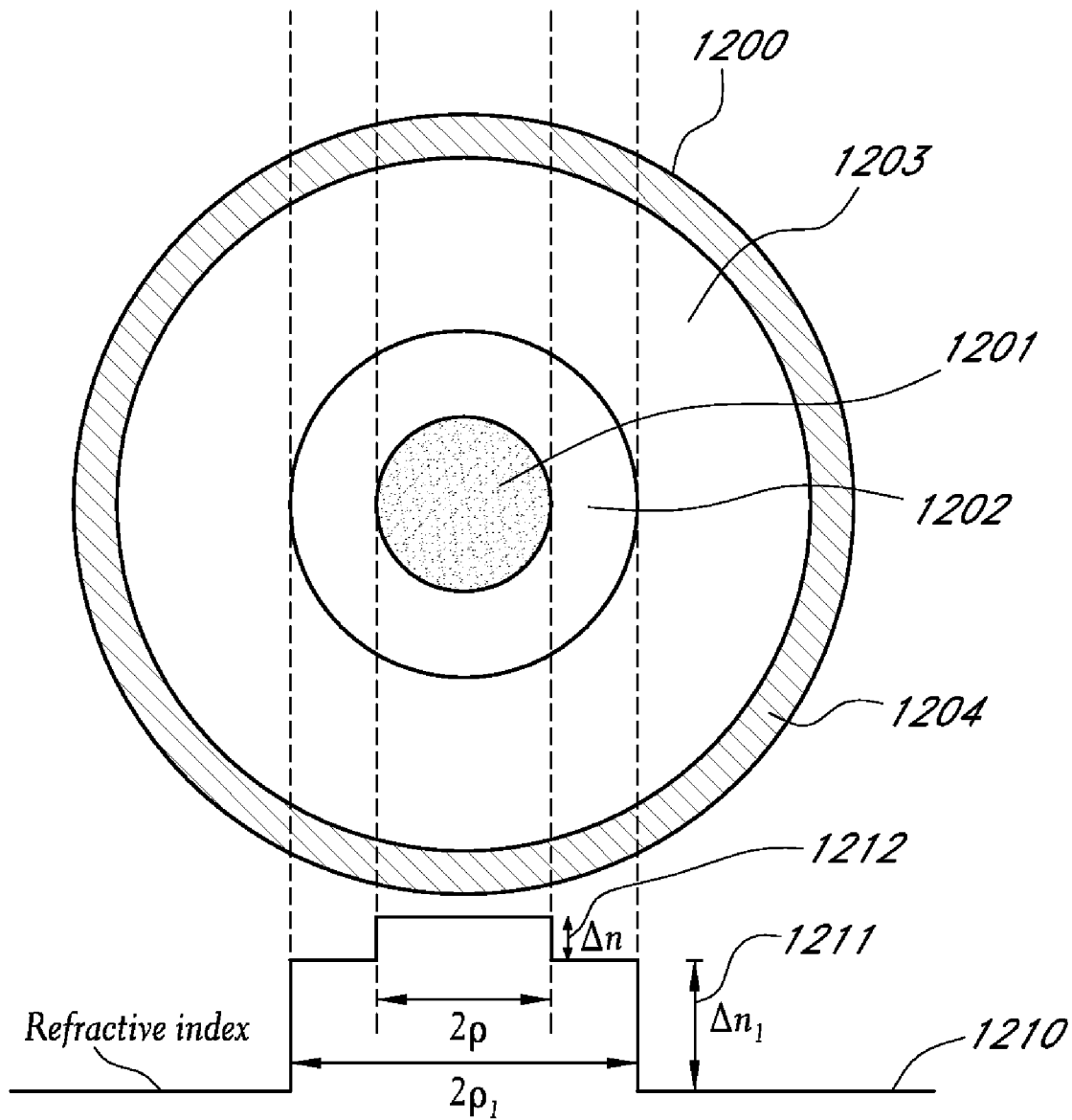
FIG. 13 schematically illustrates a bent resistant fiber design incorporating a doped core fabricated a stack-and-draw process such as described herein.

For example, the design in FIG. 13 can be used to improve (e.g., reduce) bending loss of large core fiber 1200 with very small NA, e.g. NA<0.05 and weak guiding. A first cladding layer 1202 is placed next to a core 1201 to provide the small $\Delta n$, which supports 1 to 10 modes in the partially or entirely rare earth doped core. The index difference between the first layer 1202 and a second layer 1203, $\Delta n_1$, can be chosen to be much larger than $\Delta n$, e.g. $\Delta n_1 > 1.5\Delta n$ to reduce bend loss, helped by the higher $\Delta n_1$. The fiber further comprises a coating 1204 surrounding the second cladding layer 1203. The first cladding layer 1202 diameter, $2\rho_1$, only needs to be slightly larger than core 1201 diameter, $2\rho$, e.g. $\rho_1 > 1.1\rho$. Too large $\rho_1$ and $\Delta n$ can lead to large number mode being supported in the combined waveguide formed by core 1201 and the first cladding layer 1202. Launching the fundamental mode may be difficult and inter-mode coupling may be increased if too many modes are supported by the core 1201 and first cladding 1202. Since the mode supported in the core 1201 has better overlap with the rare earth doped core and consequently have more gain, light in modes with significant amount of power in the first cladding 1202 will be discriminated.

Figure 14:
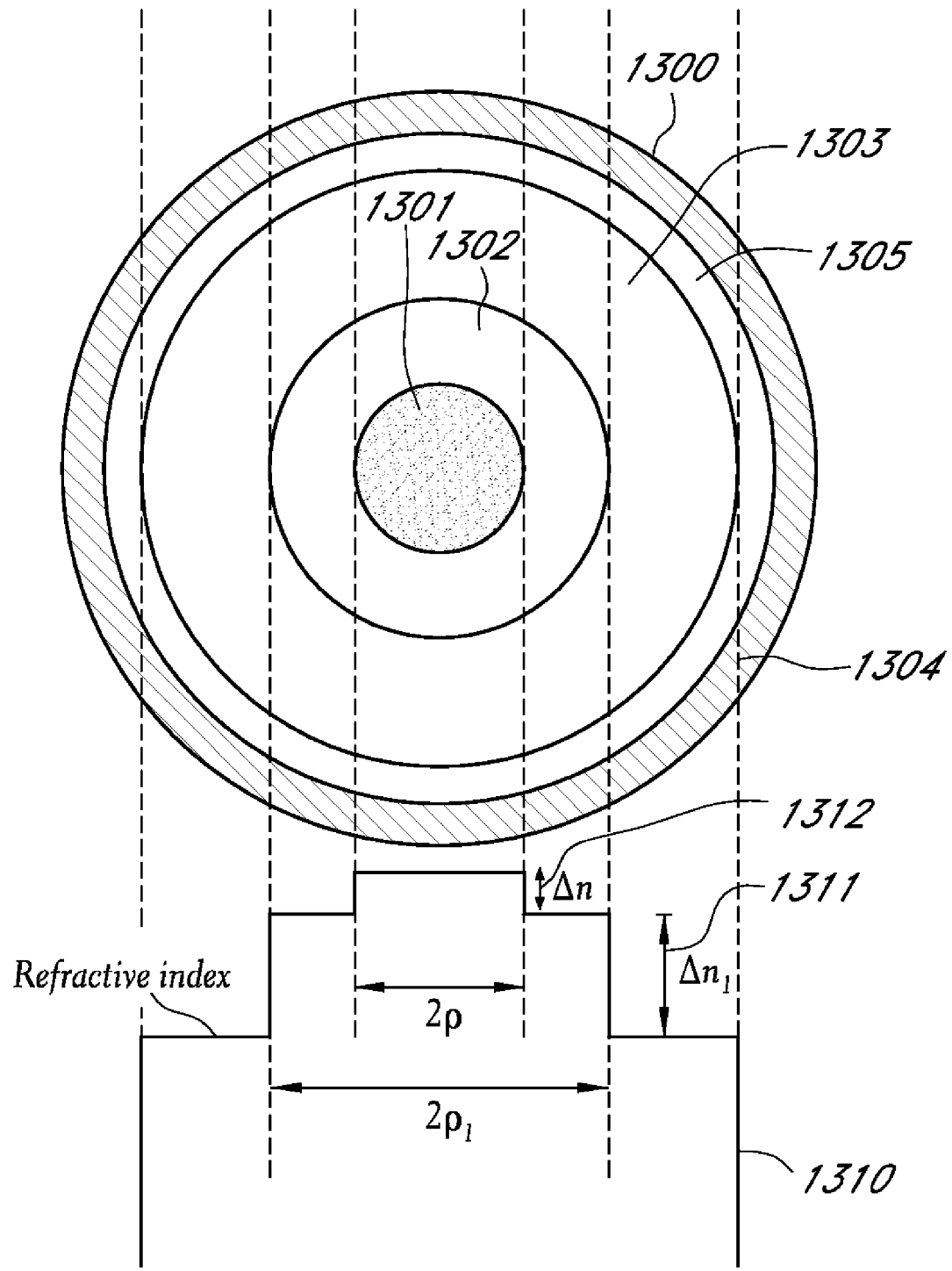
FIG. 14 schematically illustrates a double cladding fiber formed by a process described herein.

A double cladding fiber 1300 is shown in FIG. 14 like the fiber in depicted in FIG. 13, includes a core 1301, first cladding 1302 and second cladding 1303 and a coating 1304. The fiber shown in FIG. 14 further comprises third cladding layer 1305 between a second cladding layer 1303 and the coating 1304.

A small $\Delta n$ may be provided between the first cladding layer 1302 and the core 1301 to supports 1 to 10 modes in the partially or entirely rare earth doped core. The index difference between the first layer 1302 and a second layer 1303, $\Delta n_1$, can be chosen to be much larger than $\Delta n$, e.g. $\Delta n_1 > 1.5\Delta n$ to reduce bend loss, helped by the higher $\Delta n_1$. The first cladding layer 1302 diameter, $2\rho_1$, only needs to be slightly larger than core 1301 diameter, $2\rho$, e.g. $\rho_1 > 1.1\rho$. Too large $\rho_1$ and $\Delta n$ can lead to large number mode being supported in the combined waveguide formed by core 1301 and the first cladding layer 1302. Launching the fundamental mode may be difficult and inter-mode coupling may be increased if too many modes are supported by the core 1201 and first cladding 1202.

The index difference between the second layer 1303 and a third layer 1305 can be chosen to be much larger than $\Delta n$ as well as well as larger than $\Delta n_1$ in some embodiments. The third cladding 1305 can provide a propagation region comprising the core 1301, first cladding 1302, and second cladding 1303 for propagating pump radiation, for example, in a fiber amplifier or laser.

The fibers 1200 and 1300 may have large effective area and may be doped with rare earth elements. Glass compositions having an index of refraction close to that of silica may also be used in the core as described above. Additionally, stack and draw processes such as described above may be used to provide increase uniformity in refractive index across the core. Other features and methods described herein may also be used in the fibers 1200, 1300 shown in FIGS. 13 and 14.

A wide variety of variations are possible. Components may be added, removed, or reordered. Different components may be substituted out. The arrangement and configuration may be different. Similarly, processing steps may be added or removed, or reordered.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A step index optical fiber comprising:
a core having a core radius $\rho$;
a first cladding disposed about said core; and
a second cladding disposed about said first cladding, said first cladding having an outer radius $\rho_1$, said core and said first cladding having a difference in index of refraction $\Delta n$, and said first cladding and said second cladding having a difference in index of refraction $\Delta n_1$,
wherein (i) less than 10 modes are supported in said core, (ii) the first cladding radius, $\rho_1$, is greater than about $1.1\rho$ and less than about $2\rho$, and (iii) the refractive index difference between said first cladding and said second cladding, $\Delta n_1$, is greater than about $1.5\Delta n$ and less than about $50\Delta n$.

2. A large-core optical fiber comprising:
a core having a core radius p and a core index of refraction $n_{core}$;
a first cladding disposed about said core, said first cladding having an outer radius $\rho_1$ and an index of refraction $n_{c1}$, said core and said first cladding having a difference in index of refraction $\Delta n = n_{core} - n_{c1}$, and a numerical aperture (NA) less than about 0.05, said NA determined by $n_{core}$ and $n_{c1}$; and
a second cladding disposed about said first cladding, said first cladding and said second cladding having a difference in index of refraction $\Delta n_1$,
wherein the first cladding radius, $\rho_1$, is greater than about $1.1\rho$ and less than about $2\rho$, and the refractive index difference between said first cladding and said second cladding, $\Delta n_1$, is greater than about $1.5\Delta n$ and less than about $50\Delta n$.

3. The large-core optical fiber of claim 2, said large-core optical fiber being bendable and configured with a reduced bend loss relative to a large-core optical fiber having substantially the same core radius, p, and refractive index difference between cladding and core, $\Delta n$.

4. The large-core optical fiber of claim 2, wherein $\Delta n$ is less than about $10^{-3}$.

5. The large-core optical fiber of claim 2, wherein said core is as large as about 50 μm and said $\Delta n$ is less than about $8 \times 10^{-5}$.

6. The large-core optical fiber of claim 2, wherein said core is as large as about 50 μm and said NA is less than about 0.015.

7. The large-core optical fiber of claim 2, wherein said large-core optical fiber comprises a step-index fiber.

8. The large-core optical fiber of claim 2, wherein said core comprises a doped region having an average refractive index within about ±0.003 or less of the refractive index of silica.

9. The large-core optical fiber of claim 2, wherein said first cladding is slightly larger than said core and said first cladding radius, $\rho_1$, is in the range $1.1\rho < \rho_1 < 1.5\rho$.

10. The large-core optical fiber of claim 2, wherein $1.5\Delta n < \Delta n_1 < 10\Delta n$.

11. The large-core optical fiber of claim 2, wherein said core is partially rare earth doped.

12. The large-core optical fiber of claim 2, wherein said core is entirely rare earth doped.

13. The large-core optical fiber of claim 2, wherein said core radius is as large as about 25 μm.

14. The large-core optical fiber of claim 2, further comprising a third cladding disposed about said second cladding, and a pump propagation region comprising said core, said first cladding, and said second cladding.

15. The large-core optical fiber of claim 2, further comprising a coating, and an additional cladding disposed between said coating and said second cladding to form a pump guide.

16. The large-core optical fiber of claim 2, wherein said core has an effective refractive index uniformity with less than about $5 \times 10^{-4}$ maximum peak-to-peak variation.

17. The large-core optical fiber of claim 2, wherein a portion of said large-core optical fiber comprises holey fiber.

18. The large-core optical fiber of claim 2, wherein said core comprises:
   silica having a refractive index;
   at least about 10 mol % phosphorus in said silica;
   at least about 10 mol % boron in said silica;
   rare earth ions in said silica, said rare earth ions having a concentration in said silica of at least about 1000 mol ppm,
   wherein said silica having said phosphorus, said boron, and said rare earth ions therein has a refractive index within about ±0.003 or less of the refractive index of the silica.

19. A large-core optical fiber comprising:
   a core having a core radius $\rho$ and a core index of refraction $n_{core}$, and having substantial refractive index uniformity over said core;
   a first cladding disposed about said core, said first cladding having an outer radius $\rho_1$, said core and said first cladding having a difference in index of refraction $\Delta n$; and
   a second cladding disposed about said first cladding, said first cladding and said second cladding having a difference in index of refraction $\Delta n_1$,
   wherein the first cladding radius, $\rho_1$, is greater than about $1.1\rho$ and less than about $2\rho$, and the refractive index difference between said first cladding and said second cladding, $\Delta n_1$, is greater than about $1.5\Delta n$ and less than about $50\Delta n$.

20. The large-core optical fiber of claim 19, wherein said core has an effective refractive index uniformity with less than about $5 \times 10^{-4}$ maximum peak-to-peak variation.

21. The large-core fiber of claim 19, wherein a combined waveguide is formed by said core and said first cladding, and values of said first cladding radius $\rho_1$ and said $\Delta n$ are such that the number of modes supported in the combined waveguide and inter-mode coupling among the number of supported modes are limited such that a mode supported in said core has increased gain relative to a mode having substantial power in said first cladding.

22. An optical fiber system for providing optical amplification, the optical fiber system comprising:
   the large-core optical fiber of claim 2, wherein said core of said large-core fiber is doped with one or more types of rare earth ions, said large-core optical fiber comprising a combined waveguide formed by said core and said first cladding layer;
   an optical pump optically coupled to said large-core optical fiber; and
   an optical source optically coupled to an input of said large-core optical fiber.

23. The optical fiber system of claim 22, wherein said combined waveguide is configured such that a mode supported in said core has increased gain relative to a mode having substantial power in said first cladding.

24. The optical fiber system of claim 22, wherein said core is configured to receive an input beam launched in said core, wherein said input beam is in a fundamental mode of said large-core optical fiber.

25. The optical fiber system of claim 22, wherein said large-core optical fiber is configured to support 1 to 10 modes in said core.

26. The optical fiber system of claim 22, wherein values of said first cladding radius $\rho_1$ and said $\Delta n$ are such that the number of modes supported in said combined waveguide and inter-mode coupling among the number of supported modes are limited such that a mode supported in said core has increased gain relative to a mode having substantial power in said first cladding.

27. The optical fiber system of claim 22, said core having substantial refractive index uniformity.

28. The optical fiber system of claim 22, wherein said core radius is as large as about 25 μm.

29. The optical fiber system of claim 22, wherein a portion of said large-core optical fiber comprises holey fiber.

30. The optical fiber system of claim 22, wherein said large-core optical fiber is bendable and configured with a reduced bend loss relative to a large-core optical fiber having substantially the same core radius, $\rho$, and refractive index difference between cladding and core, $\Delta n$.

31. The optical fiber system of claim 22, wherein said large-core optical fiber further comprises a third cladding disposed about said second cladding, and a pump propagation region comprising said core, said first cladding, and said second cladding.

32. The large-core optical fiber of claim 22, further comprising a coating, and an additional cladding disposed between said coating and said second cladding to form a pump guide.

33. The optical fiber system of claim 22, wherein said first cladding is slightly larger than said core and said first cladding radius, $\rho_1$, is in the range $1.1\rho < \rho_1 < 1.5\rho$.

34. The optical fiber system of claim 22, wherein said input of said large-core optical fiber is tapered, said large-core optical fiber has a length extending from said tapered input, and said tapered input supports a reduced number of optical modes than the length extending from said tapered input.

35. The optical fiber system of claim 22, wherein said core of said large-core optical fiber comprises:
   silica having a refractive index;
   at least about 10 mol % phosphorus in said silica;
   at least about 10 mol % boron in said silica;
   rare earth ions in said silica, said rare earth ions having a concentration in said silica of at least about 1000 mol ppm,
   wherein said silica having said phosphorus, said boron, and said rare earth ions therein has a refractive index within about ±0.003 or less of the refractive index of the silica.

* * * * *

UNITED STATES PATENT AND TRADEMARK OFFICE
CERTIFICATE OF CORRECTION

| | | |
|---|---|---|
| PATENT NO. | : 8,213,758 B2 | Page 1 of 1 |
| APPLICATION NO. | : 12/789931 | |
| DATED | : July 3, 2012 | |
| INVENTOR(S) | : Dong et al. | |

It is certified that error appears in the above-identified patent and that said Letters Patent is hereby corrected as shown below:

In column 11 at line 8, change "V=2πρNA/λ," to --V=2πρNA/λ--.

In column 14 at line 40, in Claim 2, change "p" to --ρ--.

In column 14 at line 59, in Claim 3, change "p," to --ρ,--.

In column 16 at line 42, in Claim 32, delete "large-core" before --optical fiber--, insert --system-- following --optical fiber--, and insert --said large-core optical fiber-- before --further--.

Signed and Sealed this
Twenty-seventh Day of November, 2012

David J. Kappos
*Director of the United States Patent and Trademark Office*